US006947903B1

(12) United States Patent
Perry

(10) Patent No.: US 6,947,903 B1
(45) Date of Patent: Sep. 20, 2005

(54) METHOD AND SYSTEM FOR MONITORING A SUPPLY-CHAIN

(75) Inventor: Brian M. Perry, Upton, MA (US)

(73) Assignee: elcommerce.com.inc., Holliston, MA (US)

(*) Notice: Subject to any disclaimer, the term of this patent is extended or adjusted under 35 U.S.C. 154(b) by 0 days.

(21) Appl. No.: 09/546,347

(22) Filed: Apr. 7, 2000

Related U.S. Application Data

(60) Provisional application No. 60/147,670, filed on Aug. 6, 1999.

(51) Int. Cl.[7] ............................................. G06F 17/60
(52) U.S. Cl. ..................................................... 705/28
(58) Field of Search ............................. 705/10, 28, 22, 705/29

(56) References Cited

U.S. PATENT DOCUMENTS

| | | | |
|---|---|---|---|
| 4,799,156 A | 1/1989 | Shavit et al. ............... | 364/401 |
| 5,406,475 A | 4/1995 | Kouchi et al. .............. | 364/401 |
| 5,611,051 A | 3/1997 | Pirelli | |
| 5,625,816 A * | 4/1997 | Burdick et al. ........ | 707/103 R |
| 5,765,143 A | 6/1998 | Sheldon et al. ............... | 705/28 |
| 5,884,300 A | 3/1999 | Brockman | |
| 5,950,173 A | 9/1999 | Perkowski | |
| 5,953,707 A * | 9/1999 | Huang ........................ | 705/10 |
| 5,966,707 A | 10/1999 | Van Huben et al. | |

(Continued)

FOREIGN PATENT DOCUMENTS

JP        408235274 A   *  9/1996   ........... G06F 19/00

OTHER PUBLICATIONS

Dilger, Karen Abramic: "From ship to shore"; Manufacturing Systems, v17, n2, p83-90; Feb. 1999.*

(Continued)

*Primary Examiner*—Jeffrey A. Smith
(74) *Attorney, Agent, or Firm*—Hamilton, Brook, Smith & Reynolds, P.C.

(57) ABSTRACT

A method of monitoring supply chain activity throughout a plurality of supply chain sites includes extracting, at each supply chain site, supply-related data to be monitored. The data is maintained in plural formats at the supply chain sites, and translated the data to a common format. The extracted data is then uploaded to and collected, from each supply chain site, to a data collection center or site. Upon a user request, a portion of the collected data is formatted, at the data collection site, into one of a plurality of views, responsive to criteria selected by the user, for presentation to the user, the portion of formatted data being dependent on access rights granted to the user's supply chain site. Finally, the formatted data view is published to the user's supply chain site. The data collection center comprises a data collector in which the uploaded data is stored, and a publisher for publishing data from the data collector upon request. Each supply chain site has a data storage device for maintaining its own supply-chain data, a data transfer engine (DTE), for transferring the supply-chain data to the data collection center, input means for allowing a user to query the data collector, and a display for displaying data published by the publisher in response to a query. The inbound data received from the multiple supply chain sites is monitored at the data collection site. If a problem condition is detected, such as a forecasted or present shortage or surplus, an alert is asserted, for example, by highlighting an Alert indicator, such as an Alert tab, on a user screen. Upon selection of the highlighted Alert indicator by a user, details of the detected problem condition are displayed.

55 Claims, 24 Drawing Sheets

U.S. PATENT DOCUMENTS

| | | | |
|---|---|---|---|
| 5,974,395 A * | 10/1999 | Bellini et al. ................... | 705/9 |
| 6,157,915 A | 12/2000 | Bhaskaran et al. | |
| 6,195,643 B1 * | 2/2001 | Maxwell ...................... | 705/10 |
| 6,266,805 B1 | 7/2001 | Nwana et al. | |
| 6,289,462 B1 | 9/2001 | McNabb et al. | |
| 6,317,725 B1 * | 11/2001 | Muraoka ..................... | 705/28 |
| 6,324,522 B2 | 11/2001 | Peterson et al. | |
| 6,327,594 B1 | 12/2001 | Van Huben et al. | |
| 6,381,579 B1 | 4/2002 | Gervais et al. | |
| 6,397,226 B1 | 5/2002 | Sage | |
| 6,401,131 B1 | 6/2002 | Haverstock et al. | |
| 6,437,787 B1 | 8/2002 | Wu | |
| 6,546,374 B1 | 4/2003 | Esposito et al. | |
| 6,622,056 B1 | 9/2003 | Lindell | |
| 6,725,222 B1 | 4/2004 | Musgrove et al. | |

OTHER PUBLICATIONS

McLeod, D., "The Revolution in Retail E—Business", *Financial Mail*, Sep. 24, 1999, p. 50.

Baljko, J.L., "Study: Purchasers want SCM software to be comprehensive", source unknown.

"Customer-Centric eBusiness for Sustainable Growth and Profitability," *i2 Technologies*, Jun. 1999.

"The i2 Technology Computers and Electronics Solution," http://www.i2.com/solutions/industry/ind . . . Industry=High%20Tech20and%20 Electronics, Jul. 30, 1999.

\* cited by examiner

FIG. 3A

IEC Supply Management

File  Edit  View  Help

Boards | Parts | MRPs | Vendors | Sales | Reports | ALERT

Board Type
- Active by Board
- Active by CM
- Pre-Production
- Engineering
- Obsolete
- Combined

Using IEC Parts
- Boards only
- Boards and Parts

104A

| Board | Board Name | Manufacturer | Status | Year | Week |
|---|---|---|---|---|---|
| 200-520-921 | Fiber Drtr Board | CM-KK | Active | 1999 | 11 |
| 200-520-921 | | CM-NN | Active | 1999 | 10 |
| 200-520-921 | | CM-KK | Active | 1999 | 10 |
| 200-521-970 | Fiber Dis | CM-NN | Active | 1999 | 11 |
| 200-521-970 | | CM-KK | Active | 1999 | 10 |
| 200-650-905 | | CM-MM | Active | 1999 | 11 |
| 200-690-903 | | CM-MM | Active | 1999 | 11 |
| 200-692-905 | Comm Brd | CM-NN | Active | 1999 | 11 |
| 200-692-905 | | CM-LL | Active | 1999 | 10 |
| 200-693-902 | EPO Cntr | CM-LL | Active | 1999 | 10 |
| 200-770-901 | EDM PDU | CM-LL | Active | 1999 | 10 |
| 200-811-921 | S3 UFDI | CM-LL | Active | 1999 | 10 |
| 200-819-914 | S3 ESC DIR | CM-LL | Active | 1999 | 11 |
| 200-827-904 | 1G | CM-LL | Active | 1999 | 10 |
| 200-827-924 | 512 MB | CM-MM | Active | 1999 | 10 |
| 200-852-905 | CHNL Adap | CM-LL | Active | 1999 | 11 |
| 200-852-905 | | CM-LL | Active | 1999 | 10 |
| 200-866-902 | Terin Adap | CM-LL | Active | 1999 | 10 |
| 200-866-903 | Terin Adap | CM-KK | Active | 1999 | 10 |
| 200-879-900 | | CM-MM | Active | 1999 | 10 |
| 200-880-914 | ESCON OR | CM-LL | Active | 1999 | 11 |
| 200-881-903 | SCSI DB | CM-LL | Active | 1999 | 10 |
| 200-883-903 | S3 SCSI Adap | CM-LL | Active | 1999 | 10 |
| 200-888-900 | SYM 3 | CM-KK | Active | 1999 | 10 |
| 200-895-924 | Escon-2 port | CM-NN | Active | 1999 | 10 |
| 200-895-924 | ESCON DIR | CM-KK | Active | 1999 | 10 |
| 200-895-974 | ESC DIR | CM-KK | Active | 1999 | 10 |
| 200-895-974 | 2/4 Escon Dir | CM-NN | Active | 1999 | 10 |
| 200-896-977 | UFDI | CM-NN | Active | 1999 | 10 |

Board Type - Active by Board    7/22/99    2:32 AM

FIG. 3B

| Board | Board Name | Manufacturer | Status | Year | W |
|---|---|---|---|---|---|
| 200-520-921 | | -KK | Active | 1999 | 11 |
| 200-520-921 | Bill of Materials | | Active | 1999 | 10 |
| 200-520-921 | IEC Supported Parts | | Active | 1999 | 10 |
| 200-521-970 | MRP for ALL-CMs | -KK | Active | 1999 | 10 |
| 200-521-970 | | CM-KK | Active | 1999 | 10 |
| 200-650-905 | | CM-MM | Active | 1999 | 11 |
| 200-690-903 | | CM-MM | Active | 1999 | 10 |
| 200-692-905 | Comm Brd | CM-MM | Active | 1999 | 11 |
| 200-692-905 | | CM-LL | Active | 1999 | 11 |
| 200-693-902 | EPO Cntr | CM-MM | Active | 1999 | 10 |
| 200-693-902 | EDM PDU | CM-LL | Active | 1999 | 10 |
| 200-770-901 | S3 UFDI | CM-LL | Active | 1999 | 10 |
| 200-811-921 | S3 ESC DIR | CM-LL | Active | 1999 | 10 |
| 200-819-914 | 1G | CM-LL | Active | 1999 | 10 |
| 200-827-904 | 512 MB | CM-LL | Active | 1999 | 11 |
| 200-827-924 | CHNL Adap | CM-MM | Active | 1999 | 10 |
| 200-852-905 | | CM-LL | Active | 1999 | 10 |
| 200-852-905 | Terin Adap | CM-LL | Active | 1999 | 11 |
| 200-866-902 | Terin Adap | CM-KK | Active | 1999 | 10 |
| 200-866-903 | | | | | |
| 200-879-900 | | | | | |

Board Type:
- Active by Board
- Active by CM
- Pre-Production
- Engineering
- Obsolete
- Combined Using IEC Parts:
- Boards only
- Boards only Parts Board Type - Active by Board    7/30/99    1:11 PM

FIG. 4

IEC Supply Management

File  Edit  View  Help

Boards | Parts | MRPs | Vendors | Sales | Reports | ALERT

Board Type
- Active by Board
- Active by CM
- Pre-Production
- Engineering
- Obsolete
- Combined
Using IEC Parts
- Boards only
- Boards and Parts

104

| OEM-ZZ Board | Board Name | Status |
|---|---|---|
| 200-895-974 | 2/4 Escon Dir | Active |
| 200-895-974 | ESC DIR | Active |
| 200-896-977 | UFDI | Active |
| 201-292-902 | | Active |
| 201-292-902 | M2E 4GB | Active |
| 201-292-922 | 2 GB | Active |
| 201-292-922 | M2 2GB | Active |
| 201-292-922 | 4 GB | Obsolete |
| 201-293-902 | M2 4GB | Obsolete |
| 201-293-902 | 1 GB | Active |
| 201-293-942 | M2 1GB | Active |
| 201-293-942 | 512 MB | Active |
| 201-293-982 | 512 MB | Active |

152  154  156

Boards only    7/22/99    2:56 AM 150
118

FIG. 5A

| OEM-ZZ Part | Manuf | Manuf Part Number | Lead weeks | Buffer | NCNR | CM-KK Part |
|---|---|---|---|---|---|---|
| 004-040-101 | VEND-JJ | TCO-711JT-40MHZ | 12 | | TRUE | 7385C |
| 004-368-101 | VEND-HH | NTTA3HC-36864MHZ | 12 | 25000 | TRUE | 4435C |
| 004-368-101 | VEND-JJ | TCO-711JT-3.6864MHZ | 12 | 20000 | TRUE | 4435C |
| 012-000-021 | VEND-BB | DS1286 | 6 | | FALSE | 4569C |
| 012-000-021 | VEND-BB | DS1232S/EMC | 6 | | FALSE | 4569C |
| 014-603-085 | VEND-BB | DS1250Y-70 | 9 | | FALSE | 6225C |
| 064-000-011 | VEND-DD | SG-615PTJ-60.0000MHZ | 12 | | TRUE | 13190C |
| 064-000-011 | VEND-JJ | TCO-711JT 60.000MHz | 12 | | TRUE | 13190c |
| 064-000-012 | VEND-DD | SG-615P-20.000 | 14 | | TRUE | 13191c |
| 064-000-012 | VEND-JJ | TCO-711JT 20.000MHz | 12 | | TRUE | 13191C |
| 064-000-023 | VEND-JJ | SG-615PTJ-30.0000MHZ | 12 | | TRUE | 9292C |
| 064-000-040 | VEND-HH | NTHA8HC3-37.5000 | 12 | | TRUE | 35320C |
| 064-000-040 | VEND-JJ | TCO-711ZH 37.500 | 12 | | TRUE | 35320C |

IEC Supply Management

Boards / Parts / MRPs / Vendors / Sales / Reports / ALERT

IEC Parts Profile
- By NAED Number
- By Manuf Number
- By OEM-ZZ Number
- By OEM-ZZ Class
- By Manufacturer
- XRef. OEM-ZZ
- XRef. CM-KK
- Resale Price Lead Times/Buffers
- By OEM-ZZ Number
- By NAED Number
- By Vendor-Part Inventory
- By OEM-ZZ Number
- By NAED Number
- By Vendor-Part Purchases
- By OEM-ZZ Number
- By NAED Number
- By Vendor-Part IEC Parts Demand
IEC Parts Admin IEC Parts Demand    7/22/99    3:08 AM

FIG. 5C

| MRP_Origin | CM | Board | Week_31 | Week_32 | Week_33 | Week_34 | Week_35 |
|---|---|---|---|---|---|---|---|
| CORK | CM-LL | 201-292-902 | | | | | |
| CORK | CM-LL | 201-292-922 | | | | | |
| CORK | CM-LL | 201-292-942 | | | | | |
| CORK | CM-NN | 201-292-982 | | | | | |
| CORK | CM-NN | 201-292-922 | | | | | |
| CORK | CM-NN | 201-292-942 | | | | | |
| CORK | CM-LL | 201-292-982 | | | | | |
| HOPKINTON | CM-LL | 201-292-902 | 0 | 0 | 0 | 0 | 0 |
| HOPKINTON | CM-LL | 201-293-922 | 200 | 200 | 200 | 200 | 200 |
| HOPKINTON | CM-LL | 201-293-942 | 60 | 60 | 60 | 60 | 60 |
| TOTALS FOR | LEAD TIME | PERIOD | 260 | 260 | 260 | 260 | 260 |

IEC Supply Management — File Edit View Help

Boards | Parts | MRPs | Vendors | Sales | Reports | ALERT

- IEC Parts Profile
  - By NAED Number
  - By Manuf Number
  - By OEM-ZZ Number
  - By OEM-ZZ Class
  - By Manufacturer
  - XRef. OEM-ZZ
  - XRef. CM-KK
  - Resale Price
- Lead Times/Buffers
  - By OEM-ZZ Number
  - By NAED Number
  - By Vendor-Part
- Inventory
  - By OEM-ZZ Number
  - By NAED Number
  - By Vendor-Part
- Purchases
  - By OEM-ZZ Number
  - By NAED Number
  - By Vendor-Part
- IEC Parts Demand
- IEC Parts Admin Demand Through Lead Time (6 weeks) for Part - 012-000-021 (VEND-BB DS1232S/TR/OEM-ZZ) | 7/22/99 | 3:12 AM

FIG. 7A

| | | | | | | |
|---|---|---|---|---|---|---|
| OEM-ZZ | Order | NAED | Description | Customer PN | Qty. | Qty. |
| CM-LL8 | 4000088 | 777283001 | TCO-711JT-66MI- | | 0 | 100 |
| CM-LL8 | 4000107 | 789514010 | DS1232S/T&R/E | 012-000-021 | 1000 | 0 |
| CM-LL8 | 4000108 | 789514010 | DS1232S/T&R/E | 012-000-021 | 1000 | 0 |
| CM-LL8 | 4000109 | 789514010 | DS1232S/T&R/E | 012-000-021 | 1000 | 0 |
| CM-LL8 | 4000110 | 789514010 | DS1232S/T&R/E | 012-000-021 | 2000 | 0 |
| CM-LL8 | 4000111 | 789514010 | DS1232S/T&R/E | 012-000-021 | 7000 | 0 |
| CM-LL8 | 4000112 | 789522000 | DS1286/EMC | 012-000-019 | 456 | 0 |
| CM-LL8 | 4000113 | 789522000 | DS1286/EMC | 012-000-019 | 312 | 0 |
| CM-LL8 | 4000114 | 789522000 | DS1286/EMC | 012-000-019 | 468 | 0 |
| CM-LL8 | 4000115 | 789522000 | DS1286/EMC | 012-000-019 | 1462 | 0 |
| CM-LL8 | 91417 | 789504505 | DS1000Z-25IND | 069-0250-202 | 1164 | 0 |
| CM-LL8 | 91420 | 789511900 | DS1231-35/EMC | 012-D1231-35 | 573 | 177 |
| CM-LL8 | 91422 | 789513001 | DS1232/EMC | 012-D1232 | 0 | 490 |
| CM-LL8 | 91425 | 789513001 | DS1232/EMC | 012-D1232 | 14000 | 0 |
| CM-LL8 | 91429 | 789514010 | DS1232S/T&R/E | 012-000-021 | 814 | 792 |
| CM-LL8 | 91435 | 789520300 | DS1250Y-70 | 014-603-085 | 0 | 0 |
| CM-LL8 | 91436 | 789520300 | DS1250Y-70 | 014-603-085 | 132 | 0 |
| CM-LL8 | 91437 | 789520300 | DS1250Y-70 | 014-603-085 | 396 | 0 |
| CM-LL8 | 91438 | 789520300 | DS1250Y-70 | 014-603-085 | 803 | 0 |
| CM-LL8 | 91439 | 789524951 | DS2108S/T&R | 061-000-054 | 6000 | 0 |
| CM-LL8 | 91444 | 789524951 | DS2108S/T&R | 061-000-054 | 10000 | 0 |
| CM-LL8 | 91445 | 789524951 | DS2108S/T&R | 061-000-054 | 3000 | 0 |
| CM-LL8 | 91446 | 789524951 | DS2108S/T&R | 061-000-054 | 6000 | 0 |
| CM-LL8 | 91447 | 600760000 | RY-5D-K | 021-400-162 | 400 | 0 |
| CM-LL8 | 91450 | 777590000 | ST415HF-90.000 | | 3000 | 0 |

METHOD AND SYSTEM FOR MONITORING A SUPPLY-CHAIN

RELATED APPLICATION

This application claims priority to U.S. Provisional Application No. 60/147,670 filed on Aug. 6, 1999, and is related to application Ser. No. 09/544,916, filed Apr. 7, 2000, entitled METHOD AND SYSTEM FOR MONITORING A SUPPLY-CHAIN, by Brian M. Perry; the entire teachings of which are incorporated herein by reference.

BACKGROUND OF THE INVENTION

A typical manufacturing supply chain includes an original equipment manufacturer ("OEM"), which designs and sells equipment such as computers or other electronic equipment. To keep costs down, OEMs often contract out the manufacture of at least some of the individual components of the product, such as electronic boards, to contract manufacturers ("CMs"). The CMs must obtain the parts with which to build the boards, such as resistors and integrated circuits, which are manufactured by component manufacturers or vendors. The components are typically not sold directly to the CMs but rather are sold through distributors.

For example, FIG. 1A illustrates a supply chain 2 as is well known in the art. Included in the supply chain 2 are a distributer 16, an original equipment manufacturer (OEM) 12, one or more contract manufactures 14, and one or more vendors 18. As indicated in the figure, each of these sites must communicate with one or more of the other sites as indicated by the arrows.

Each node or link in the supply chain, i.e., each OEMs, distributor, CM and vendor, typically maintains its own private database to track and control inventory, place orders, receive orders, enterprise resource planning (ERP), material requirements planning (MRP), etc. While these supply chain sites share some data, the data is typically maintained in incompatible formats in legacy databases.

The Electronic Data Interchange ("EDI") standards have been developed to aid in the interchange of information to expedite business transactions by specifying a consistent data interchange format. Yet, in practice, how each supply chain site deals with its external environment, i.e., vendors, CMs, customers, has often been archaic and inconsistent.

Supply chain management is difficult because it depends on the axiom that a business has fundamentally correct processes. Unless the foundation for activity is well thought out, managing the chain further aggravates a company's environment. For example, not all of the information needed may be available on the legacy databases. Often, teams of programmers are utilized to implement custom design changes to these legacy databases that become overwhelmingly complex. Whether these changes are implemented by outside consultants or by in-house staff, lack of clear project goals, effective monitoring and performance review constantly plague the process.

SUMMARY OF THE INVENTION

The present invention eliminates much of the confusion which results from redesigning one or more complex legacy systems. Instead, legacy systems are left intact, and a data transfer engine ("DTE") is installed at each site. The DTE monitors the local system continuously, and takes whatever information is available. While a complete picture of the supply chain may not be provided if not all information is available, for example, if a certain attribute is not tracked at a particular site, the DTE takes whatever data is available, cleans up the data, and formats the data into a common format acceptable to a data collection site. The DTE then transmits or uploads the data to the data collection site, which is preferably a distributor or an OEM.

While some custom programming is required to extract the proper information and clean it up, no change to the existing business process is required. The programming that is required for extracting and cleaning the data is minimal compared to the major rewriting or restructuring necessary for previous known methods.

The ability to collect data and lay it out before a user in logically configured views where sources and demands are made visible, and where every view is within two or three mouse clicks away, gives unprecedented power to OEMs and distributors to monitor, analyze and control the supply chain. The present invention provides information management and analysis capabilities at the component level for manufacturers, vendors and distributors operating in partnership to manufacture subassemblies that combine to produce a finished OEM product.

The present invention facilitates the relationships between the OEM, distributor, CMs and vendors (collectively, the "sites") in the context of raw materials flow through the supply chain. A great benefit of the present invention lies in its ability to aggregate or collect, analyze, and inform multiple parties about the status of materials that move through their shared supply chain, directly influencing the success of each.

Accordingly, a method of monitoring supply chain activity throughout a plurality of supply chain sites, includes extracting, at each supply chain site, supply-related data to be monitored. The data is maintained in plural formats at the supply chain sites. The extracted data is then uploaded to and collected, from each supply chain site, to a data collection center or site, where it is stored in a common format. Upon a user request, a portion of the collected data is formatted, at the data collection site, into one of a plurality of views, responsive to criteria selected by the user, for presentation to the user, the portion of formatted data being dependent on access rights granted to the user's supply chain site. Finally, the formatted data view is published to the user's supply chain site.

The data collection center comprises a data collector in which the uploaded data is stored, and a publisher for publishing data from the data collector upon request. Each supply chain site has a data storage device for maintaining its own supply-chain data, a data transfer engine (DTE), for transferring the supply-chain data to the data collection center, input means for allowing a user to query the data collector, and a display for displaying data published by the publisher in response to a query.

In one embodiment, the data is translated at each supply chain site before uploading. Alternatively, the data is translated at the data collection site after uploading.

In one embodiment, each supply chain site is scanned at regular intervals for new or changed data. Upon finding new or changed data, the new or changed data are uploaded to the data collection site.

Plural formats can include, but are not limited to, spreadsheets, relational databases and text files. One skilled in the art would recognize that spreadsheets and databases themselves vary from vendor to vendor, and even two implementations using the same vendor's spreadsheet or database or text file will have data configured and/or formatted differently.

Data can include, but is not limited to, inventory data, purchase orders and lead time.

Data at the supply chain sites can be stored in legacy databases, that is, databases, spreadsheets, text files, and the like, which exist before implementation of the present invention.

In a further embodiment, the inbound data received from the multiple supply chain sites is monitored at the data collection site. If a problem condition is detected, such as a forecasted or present shortage or surplus, an alert is asserted, for example, by highlighting an alert indicator, such as an alert tab, on a user screen. Other possible alert condition indicators are, for example, a highlighted box or button, or a line of data in one of the screens corresponding to, say, a part number which is in an alert condition.

Upon selection of the highlighted alert indicator by a user, details of the detected problem condition are displayed. In one embodiment, the alert details are displayed in a bar graph. In another embodiment, alert details are displayed in a line graph.

In one aspect of the invention, animation is used to present data to a user. Specifically, data sets are shown within a historical basis and changes are shown evolving in animated real time.

Supply chain sites can include any or all of contract managers (CMs), vendors, distributors and an original equipment manufacturer (OEM).

In one embodiment, the data is encrypted before uploading.

Preferably, uploading the data is performed over the Internet.

In a further embodiment, materials requirements information are provided for a product at any or all stages in the product's lifecycle.

An analysis report is generated responsive to report selection by a user. The generated report is provided, responsive to user selection of report destinations, by emailing, printing, storing as a file or displaying on a monitor or a screen, the report.

Data is displayed in a window at a site's display according to a category selected by a user at the site, in response to authorization granted, for example, to the site, or to the user.

For each category, at least one analysis filter is selectable by the user for setting criteria to be used in filtering the data to be displayed. Filtering can include, for example, sorting and/or excluding certain data. Filters are preferably organized hierarchically.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A is a screen shot of board data for all active boards, sorted by board number.

FIG. 3B is a screen shot similar to that shown in FIG. 3A, showing the associated pull-down menu.

FIG. 4 is a screen shot of board data for boards using parts sold by a particular distributor.

FIG. 5A is a screen shot of parts demand information for a particular distributor.

FIG. 5C is a screen shot of parts information showing demand through lead time for a particular part, resulting from the selection made from the pull-down menu shown in FIG. 5B.

FIG. 7A is a screen shot of vendor data.

FIG. 8 is a screen shot of sales data.

FIG. 10 is a screen shot of a typical report sent to the screen.

DETAILED DESCRIPTION OF THE INVENTION

Figure 1A:
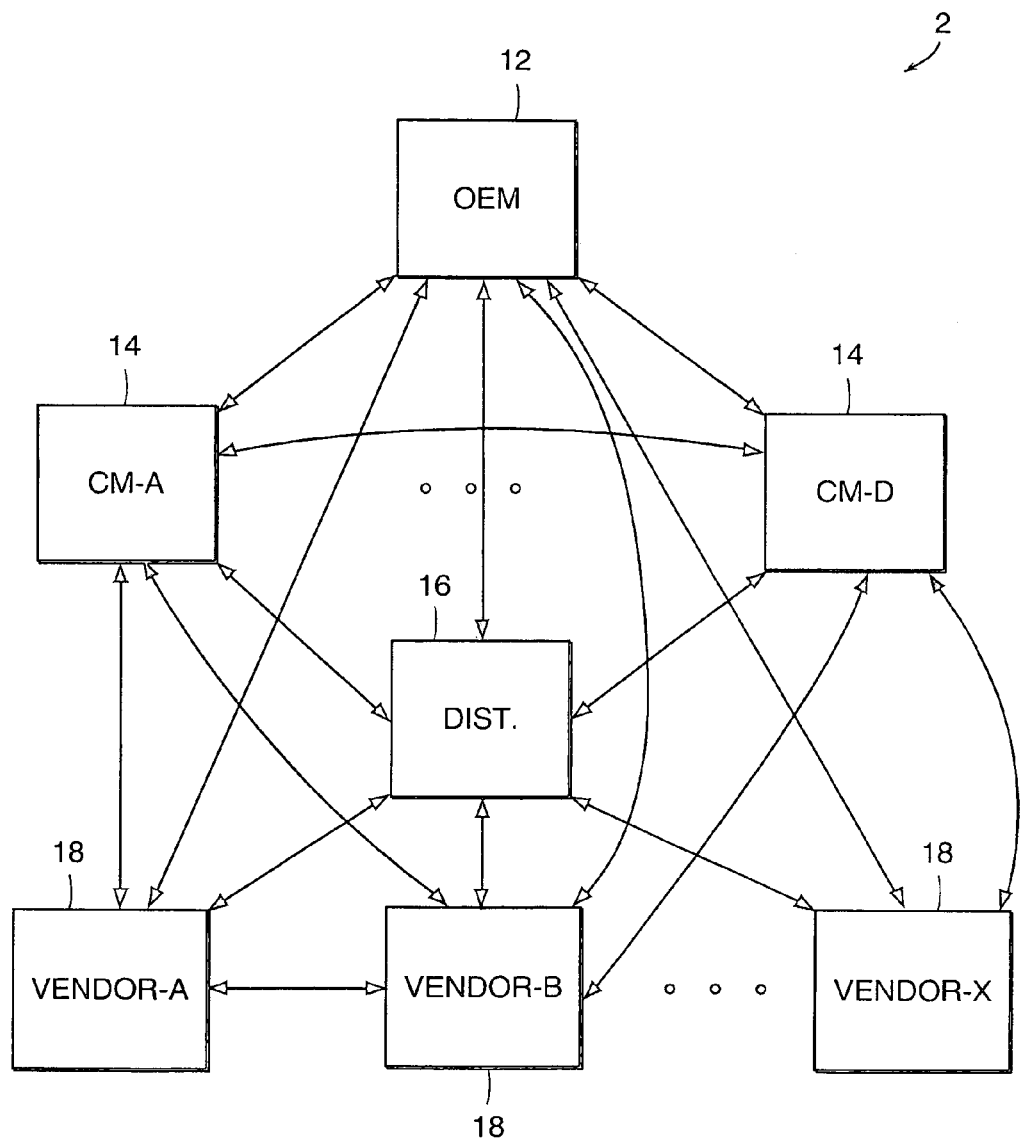
FIG. 1A is a block diagram illustrating a typical supply chain as known in the prior art.
Figure 1B:
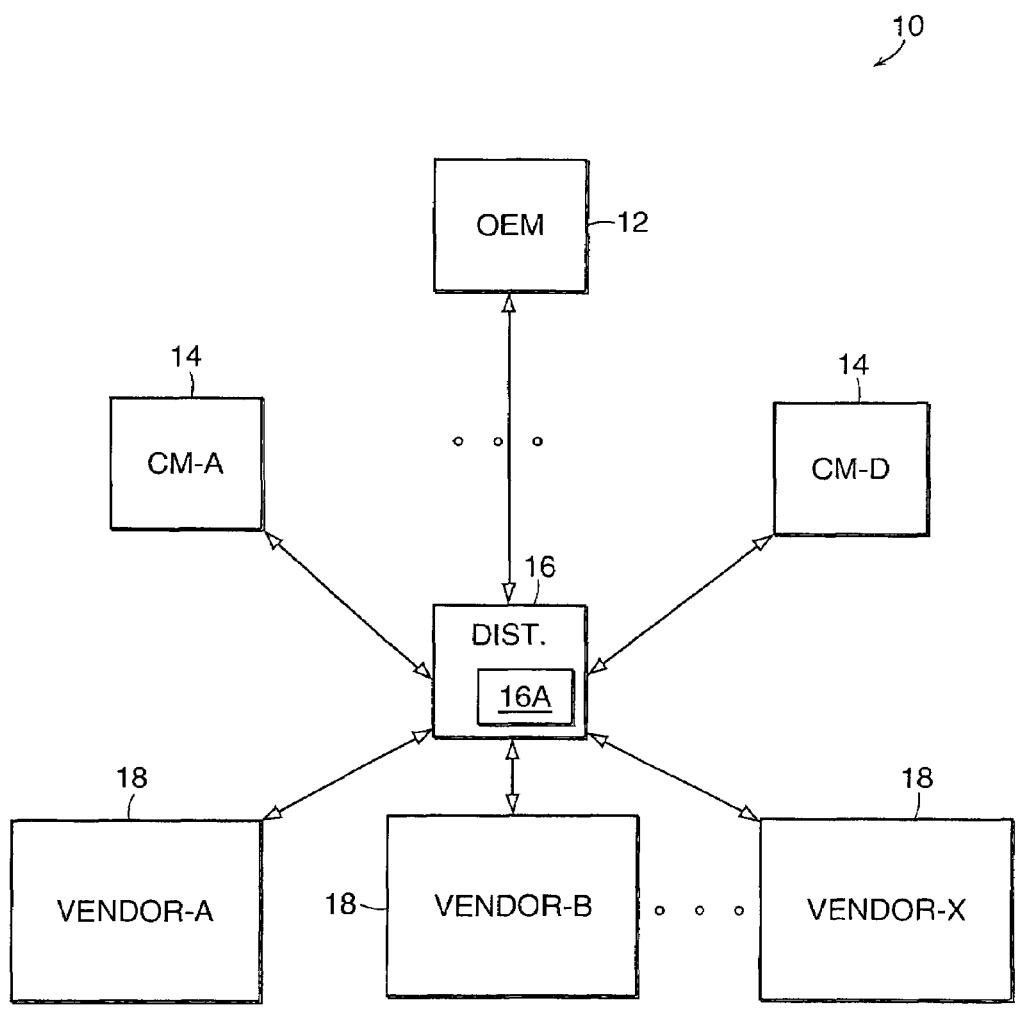
FIG. 1B is a block diagram illustrating a typical supply chain in which the present invention is employed.

FIG. 1B illustrates a supply chain 10 environment in which the present invention is employed. An original equipment manufacturer ("OEM") 12 designs products, assembles the products or contracts assembly out, receives sales orders ("SOs") from customers and generates purchase orders ("POs") to obtain the parts required to build the ordered equipment.

The POs may be sent to contract manufacturers ("CMs") 14, who build, for example, boards which typically have 50 to 200 or more parts. The OEM 12 may contract with several CMs 14 to build the same board, and/or may contract with different CMs for different boards. Here, for example, several contract manufacturers CM-A through CM-D are depicted.

The CMs 14 themselves must obtain the required parts or components, such as resistors, capacitors, semi-conductors, knobs, indicators, hinges, switches, buttons, etc., either directly from the component manufacturers, or vendors 18, or more typically, from one or more distributors 16, who generally keep inventories in stock which they (the distributors) believe will satisfy foreseeable demand.

In addition, depending on how much of the manufacturing process the OEM 12 retains for itself, the OEM may also obtain parts directly from vendors 18 or through distributors 16.

Different components and boards have different lead times, which may be dependent on the availability or lead times of components, in the case of boards, or other factors, such as a particular vendor's or CM's build schedule. That is, different items take longer than others to order, design, produce, ship etc.

Each of the organizations or sites 12–18 in the supply chain 10 is concerned with what to build and, given lead times and existing inventory, when to build and ship, so that the equipment ordered from the OEM 12 can be built and delivered in a timely fashion.

The present invention makes information regarding current orders, lead times, parts, etc. available to some or all of the supply chain sites, by collecting the data at a central site 16A and selectively publishing that data to the other sites upon request. In the embodiment of FIG. 1B, the central site 16A is located at the distributor 16. In practice, the actual location could be anywhere. In one embodiment, it is controlled by the OEM 12.

Figure 1C:
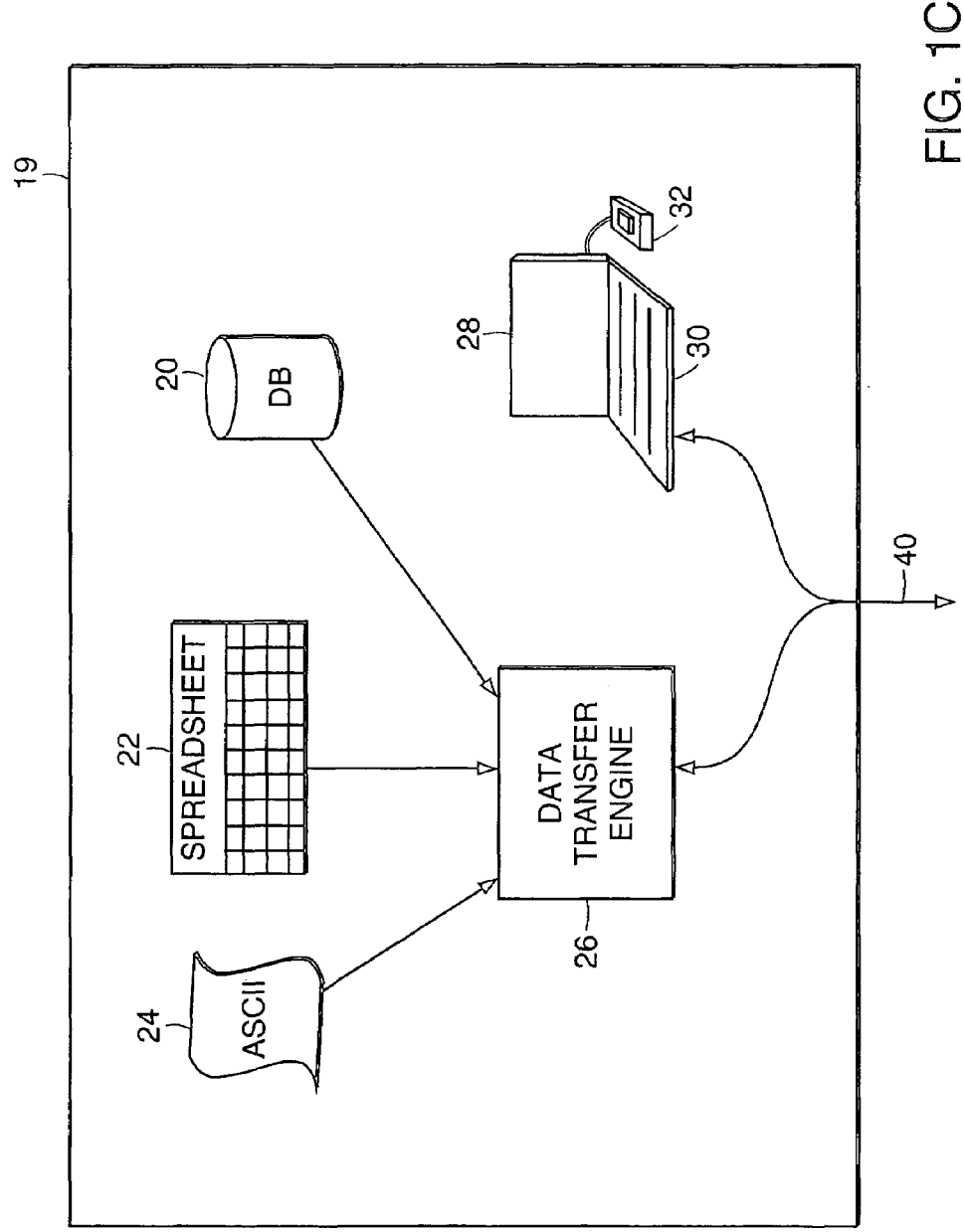
FIG. 1C is a schematic diagram illustrating that part of the present invention to be employed at each participating supply chain site.

FIG. 1C is a schematic diagram illustrating that part of the present invention to be employed at each participating supply chain site. Box 19 represents any of the sites 12–18 of FIG. 1B. Each organization or site 19 typically maintains its own data storage devices containing legacy information such as enterprise resource planning (ERP) data, material resource planning (MRP) data, purchasing information, inventory, etc.

This information may be maintained, for example in text files such as ASCII files 24, spreadsheets 22, and/or databases 20. The formats of such data may be proprietary or customized. One site might use one type of spreadsheet while another site uses another kind of spreadsheet. Similarly, one site might use a particular database while another site uses a different database. Even databases bought from the same database provider may be customized so that similar data is maintained differently at different sites. Furthermore, some sites may not retain certain data, having deemed it unimportant.

Before the development of the present invention, with all of these different legacy systems in place at the various supply chain sites 19, OEM verification of data, such as purchase orders and inventory, was extremely difficult. The quality of data from the various sites 19 is clouded because there is no lowest common denominator.

In the past, teams of Information Technology software engineers have typically re-engineered the existing systems. This can be a huge data conversion and software integration effort, even at a single site, and becomes much more problematic when trying to make the data uniform across independent contract manufacturers and vendors who likely will not be eager to redesign their business method and database. Even the Electronic Data Interchange ("EDI") specification does not provide enough structure to ensure that users use it properly.

On the other hand, the present invention takes data as it exists on each site's legacy system. Data from all of the sites is collected at the center hub 16A, or data collection site, which is preferably the distributor 16 or the OEM 12, and selectively published to the sites 19.

Data is retrieved from each site 19 by installing at each site a data transfer engine (DTE) 26, preferably implemented in software. The DTE takes data in any size or format, including various databases 24 and/or spreadsheets 22 and/or text files such as ASCII files 20, and corrects, translates and formats the data into "clean" data. In one embodiment, the DTE looks for changes to data and uploads new data to the data collection site 16A upon finding a change. Alternatively, the DTE may upload data upon some other trigger such as the end of a time period, or may upload data in response to a request from the data collection site 16A.

Communication between a site 19 and the data collection site 16A can be by any well-known means 40, for example, over the Internet or via a dial-up connection, or via a virtual private network (VPN). In one embodiment, the data is formatted using a formatting language such as XML. In one embodiment, all data transfers are encrypted. Web servers and browsers can also be employed.

The present invention is thus passive in that it takes whatever data a site has, for example, extracting data from any popular database, such as Oracle, SAP, Sybase, Bahn, etc., or from spreadsheets such as Lotus, or any data reduced to an ASCII or EDI file, or any other formatted file. No redesign or re-engineering is required.

Figure 1D:
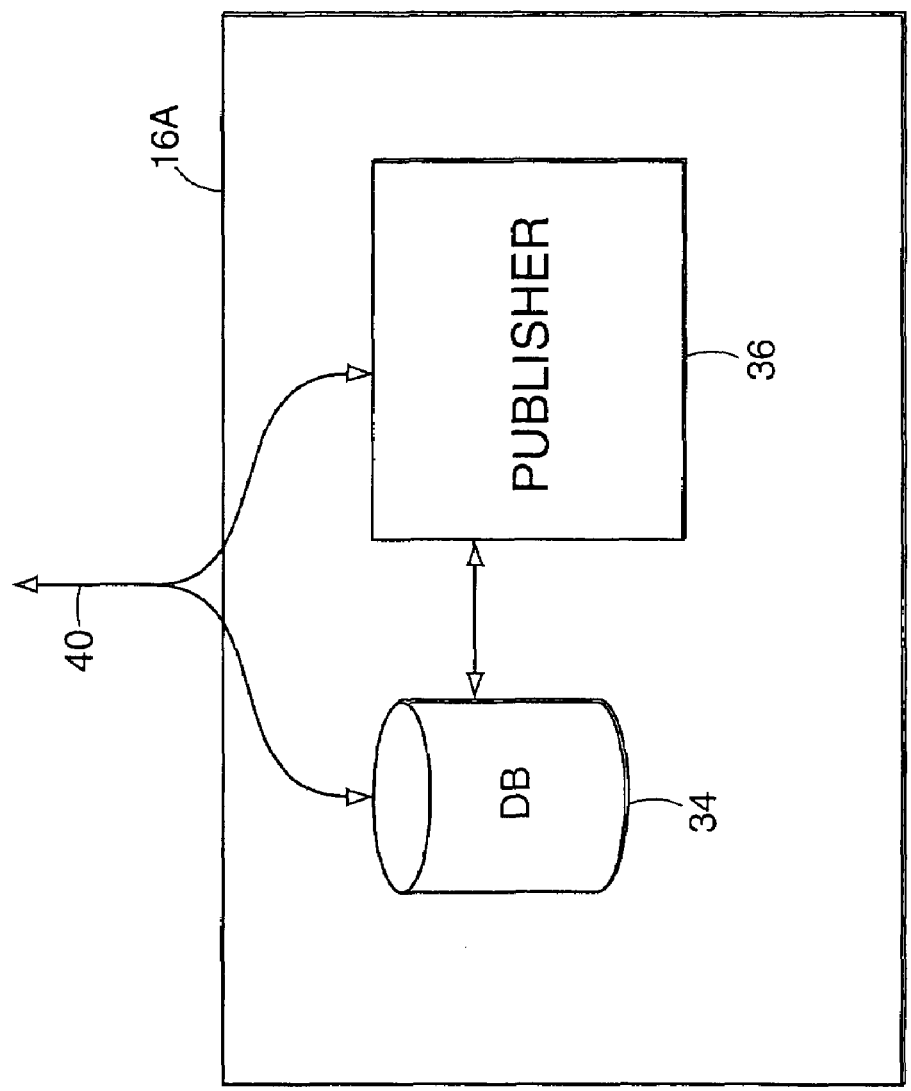
FIG. 1D is a schematic diagram illustrating that part of the present invention to be employed at the data collection site.

FIG. 1D is a schematic diagram illustrating the components of the present invention employed at the data collection site 16A. A data collection database 34 or an equivalent data storage system collects the data sent by each DTE 26 (FIG. 1C). A publisher 36 receives query requests from the various sites 19, and depending on the access rights granted to a particular requesting site, formats and publishes the relevant supply-chain data to the requesting site, which then displays the data in a logical format as described below on a monitor 28 (FIG. 1C).

Each site 19 which accesses the collected data requires one or more computers, each of which typically comprises a monitor 28 for showing the requested information or report, a keyboard 30 for entering certain information, and a mouse 32 for navigating through the screens.

Figure 1E:
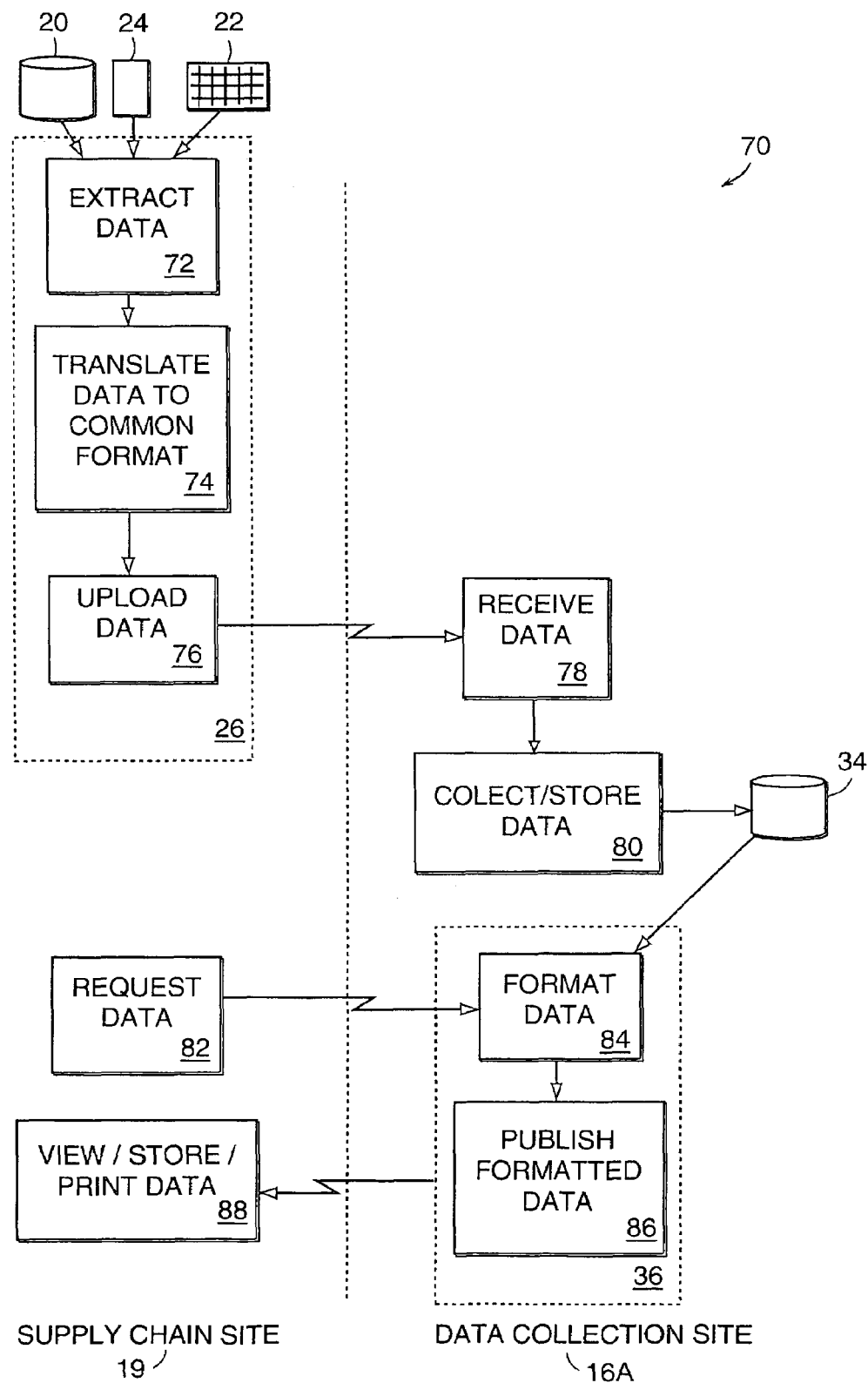
FIG. 1E is a flowchart of the process employed by an embodiment of the present invention.

FIG. 1E is a flow chart 70 illustrating the general process of an embodiment of the present invention. A typical supply chain site 19 is shown on the left side of the figure while the data collection site 16A is shown on the right side of the figure. Where possible, reference numbers correspond to those used in FIGS. 1C and 1D.

The data transfer engine 26 extracts data in step 72 from various formatted data, for example a database 20, an ASCII text file 24, or a spreadsheet 22. After the data is extracted, it is translated to a common format in step 74 in one embodiment. After translation in step 74, the data is uploaded in step 76 to the data collection site 16A were it is received in step 78. Alternatively, translation could be done after upload. The received data is then collected and stored in, for example, a database 34 (step 80).

This process of data extraction uploading and collection of the data at the data collection site 16A can be preformed regularly, upon the expiration of the predetermined time period or, for example, when a change in the data is detected at the supply chain site 19.

At some later time, a user requests certain data at step 82, at the supply chain site 19. This request is forwarded to the data collection site. In response, the data collection site 16A formats the data (step 84) and publishes the formatted data (step 86) to the supply chain site 19. The published data is then view or stored or printed, as in step 88.

Figure 2:
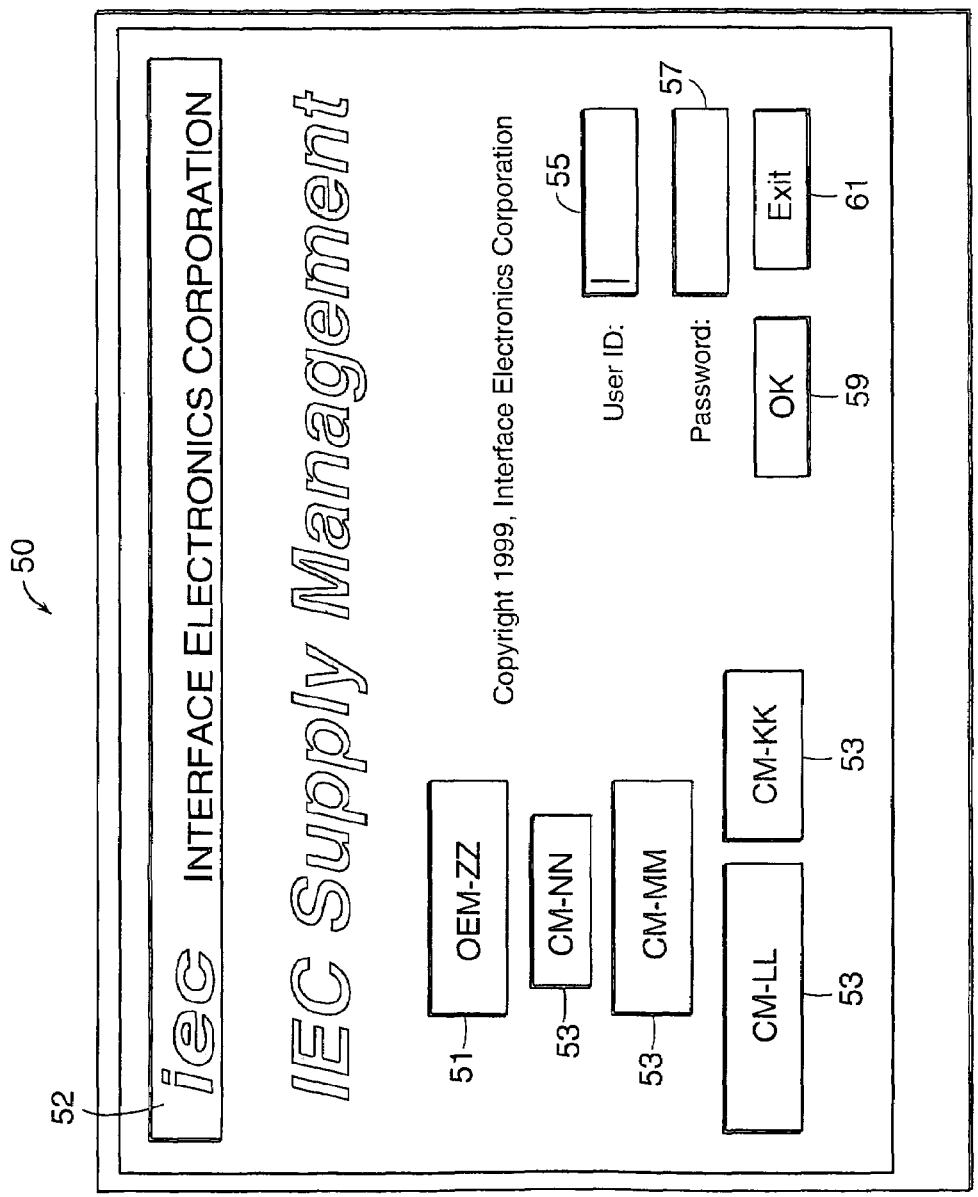
FIG. 2 is a screen shot of a login window employed by the present invention.

FIG. 2 shows a login or "splash" window 50 as might appear on a site's computer monitor 28 upon a user logging into the data collection site 16A. The login window 50 builds on the theme of collaboration between the contract manufacturers that produce the foundation of an OEM's products. Preferably, images containing company names and/or logos or trademarks are displayed for the OEM at 51, and for the contract manufacturers at 53. In one embodiment, these images 51, 53 are links to connect directly to the specific company. In the sample screen, the distributor, whose logo 52 is displayed at the top, is the data collection site.

Text entry blocks 55, 57 are provided for entering a user identification (ID) and password respectively. After entering these, a user clicks on "OK" 59 to have his ID and password verified, or clicks on "Exit" 61 to exit.

In the example embodiment, once a user has properly logged in, all data pertains to the specific OEM. In other embodiments, a distributor might select from among a plurality of OEMs, for example, via a pull-down menu. In yet another embodiment, an OEM dealing with multiple distributors could select from among a plurality of distributors.

FIG. 3A is a screen shot 100 of circuit board data for all active boards, sorted by board number. In one embodiment, this view 100 is the default screen shown to a user after a successful login.

Common to all screens after logging in is the set of tabs 102 which allow the user to navigate quickly to the desired information. When the "Boards" tab 102A is selected, a list of filters 104A specific to the display of board-related information is displayed. In the view 100 shown, the filter list 104A is divided logically into two groups.

The first group of filters, labeled "Board Type", comprises six filters in the embodiment shown. By selecting a particular filter, the user can choose to see only boards of a particular status, for example, boards that are classified as one of Active, Pre-production, Engineering or Obsolete. In addition, in this particular embodiment, Active boards can be sorted either by board number ("Active by Board") or by contract manufacturer ("Active by CM"). Finally, selecting "Combined" shows all boards. It will be obvious to one skilled in the art that other criteria for selecting and sorting boards can be provided. Thus, materials requirements information may be viewed for products at all stages in their lifecycle.

In the screen 100 of FIG. 3A, the "Board Type-Active by Board" filter has been selected. That is, the user has requested information on all boards having a status of "Active". All "Active" boards are listed in order according to the OEM's board number.

The requested information for each "active" board is retrieved from the data collection site's database 34 (FIG. 1C), sent by the publisher 36 to the requesting site, and displayed on the requesting site's monitor 28 in various columns or fields. This data may include, for example, the board's OEM part number 106, name 108, manufacturer 110, status 112, and projected delivery date 114, 116 for the corresponding manufacturer.

Because the user has selected the "Active by Board" filter, boards are listed alphanumerically by board part number 106. Note that each entry in the board column has an arrow 107 for viewing a pull-down menu, described below with respect to FIG. 3B.

In the "Board Name" field 108, a board name is provided if it is known to the system. The "Manufacturer" field 110 shows the name of a CM that manufactures the board. Note that each manufacturer can assign the same board a different name, or not assign any name at all.

The "Status" field 112 shows the status of each board. Of course, available statuses can be different according to the particular needs of the users and application, but in the illustrated embodiment, the available statuses are "Active" for boards which are currently utilized by the OEM, "Pre-production" for boards which are in final approval status by the OEM, that is, boards which are normally near complete, "Engineering" for boards which are in a pre-prototype or prototype stage and not yet used in production, and finally "Obsolete" for those boards that are not used in any present OEM machines, but which could, for example, still be made for field upgrades, probably in limited quantities.

The "Year" 114 and "Week" 116 fields show the projected delivery date for the particular board from the CM shown.

Note that a board can be listed in multiple lines, one line for each distinct set of, in this example, board name, manufacturer, status, year and week. For example, in FIG. 3A, the first three lines show a board having a part number of 200-520-921. The first line indicates that CM-KK is one of the manufacturers of this board and is currently building this board.

The second line shows that a second contract manufacturer, CM-NN, also manufactures this board, and in addition calls the board a "Fiber Drtr Board."

The third line is again for boards ordered from the first CM, CM-KK, but for a different scheduled delivery week.

Finally, a footer 118 displays the currently selected filter, here "Board Type-Active by Board.'

FIG. 3B shows a pull-down menu 120 which appears when the user holds down the mouse button over an arrow 107A in the board column 106. Selecting one of the three menu views displays detailed information for the corresponding board.

Figure 3C:
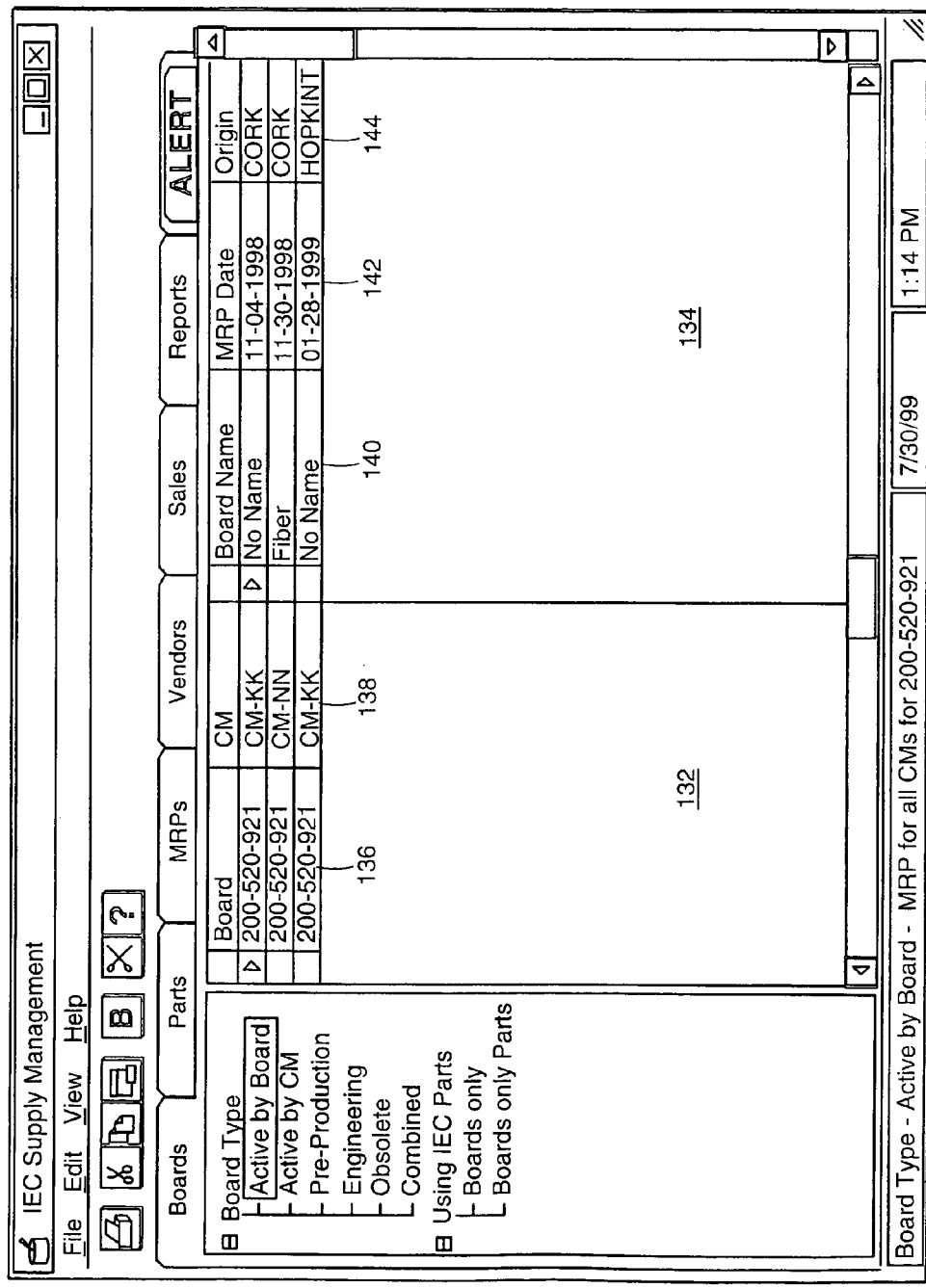
FIG. 3C is a screen shot of board data resulting from the selection made from the pull-down menu shown in FIG. 3B.

FIG. 3C shows the displayed view 130 resulting when the "MRP for ALL CMs" view is selected from the menu 120 for part number 200-520-921, i.e., any of the first three lines of FIG. 3A.

A split screen, well-known to those skilled in the art, to allow the display of non-contiguous portions 132, 134 of a view, is shown. Displayed data includes, for example, "Board" part number 136, "CM" 138, "Board Name" 140, "MRP Date" 142 and "Origin" 144 columns. Board Name corresponds to the same column of FIG. 3A. MRP Date refers to the date on which the CM must receive parts from the distributor or the component manufacturer. Origin indicates the location of the CM's plant where the board is actually being manufactured (as in Cork, Ireland).

FIG. 4 shows a view 150 displayed when the "Boards Only" filter is selected under the "Using IEC Parts" in the filter section 104. This view 150 shows data about boards using parts carried by a particular distributor, in this case IEC. Of course, if there were more than one distributor, additional filters could be available to select boards using parts handled by those distributors as well. The "Board" 152, "Board Name" 154 and "Status" 156 columns correspond to the similarly named columns of FIG. 3A. If there were more than one OEM, for instance if the data were being reviewed by a distributor who deals with mulitple OEMs, additional filters could be available to list boards of particular OEMs.

Selecting "Boards and Parts" provides an exploded view (not shown) of boards with additional detail based upon the Bill of Material, or BOM, for each board.

The view 160 of FIG. 5A is displayed upon the selection of the Parts tab 102B. A new list of filters 104B, pertaining to parts, is available in filter partition 104. Here, the "IEC Parts Demand" filter has been selected, as indicated by its being highlighted and by the footer text 118.

As with the parts views of FIGS. 3A–3C, several columns are displayed, including the OEM's part number 162, the vendor or manufacturer of the part 166, the vendor's part number 168 for this part, the vendor's lead-time ("Lead weeks") for this part, the "Buffer" 172, indicating an amount of inventory quantity, if any, that has been negotiated between the OEM and distributor/component manufacturer to be kept on hand above and beyond committed stock, a "NCNR" indicator 174 which indicates whether the item is non-cancelable, non-returnable, and a field 176 labeled "Celestica Part." Each additional CM which manufactures this part has a corresponding column (not shown), which can be scrolled into view using the scroll bar 177. Each of these CM columns, such as column 176, shows the particular CM's part number for the corresponding part.

Note that customer part numbers, as these are commonly referred to, are created by the CM or OEM, and have significance that is beyond the current transactional circle. Thus, a CM may have a customer part number that may apply to other jobs in addition to the one they perform for the current OEM. This enables the CM to sort or use this data "companywide".

In additional, there may be more than one vendor of a particular part. For example, the OEM's part number 004-368-101 is provided by two different vendors, as shown in the second and third lines of FIG. 5A. Here, the OEM feels these parts are identical and can be "second sourced" using the same number.

In fact, lines 5 and 6 of FIG. 5A indicate that two slightly different numbered parts (e.g., DS1232S/OEM-ZZ and DS1232S/TR/OEM-ZZ) from the same vendor (VEND-BB) may be used to satisfy the distributor's part. Each part is shown in its own 110 line.

Several filters 104B are provided. For example, sorting is available for parts profiles for a particular distributor such as IEC by NAED (a generic industry-wide number assigned by the National Association of Electrical Distributors), by manufacturer, or by the OEM's part number or part class. A part class is, for example, a class of components, such as resistors, perhaps of a certain wattage.

Cross reference filters are also available for OEM numbers and for each contract manufacturer. Finally, parts viewed with a parts profile can be sorted by "Resale Price", which is the resale price that the distributor or component manufacturer (the vendor) charges the CM.

As can be seen, other filter groups are available, such as "Lead Times/Buffers," in which parts are sorted, first by lead time (highest to lowest), then by buffer (highest to lowest), then by either OEM-ZZ, NAED or vendor part number, as selected. Filters are organized hierarchically and the upper levels may be closed or opened (expanded) by the user to simplify viewing.

Another filter class is Inventory. Inventory levels can be illustrated by quantity, part type (fully cross referenced), and by chain participant, i.e., by CM, distributor, or component manufacturer.

Yet another filter class is Purchases. Purchases can be referenced as backlog by the supplier, i.e., the distributor, or a vendor.

Selection of the IEC Parts Demand filter shows, going forward, which parts are due out in what weeks.

An IEC Parts Admin selection is also available to provide administrative functions to privileged users.

Figure 5B:
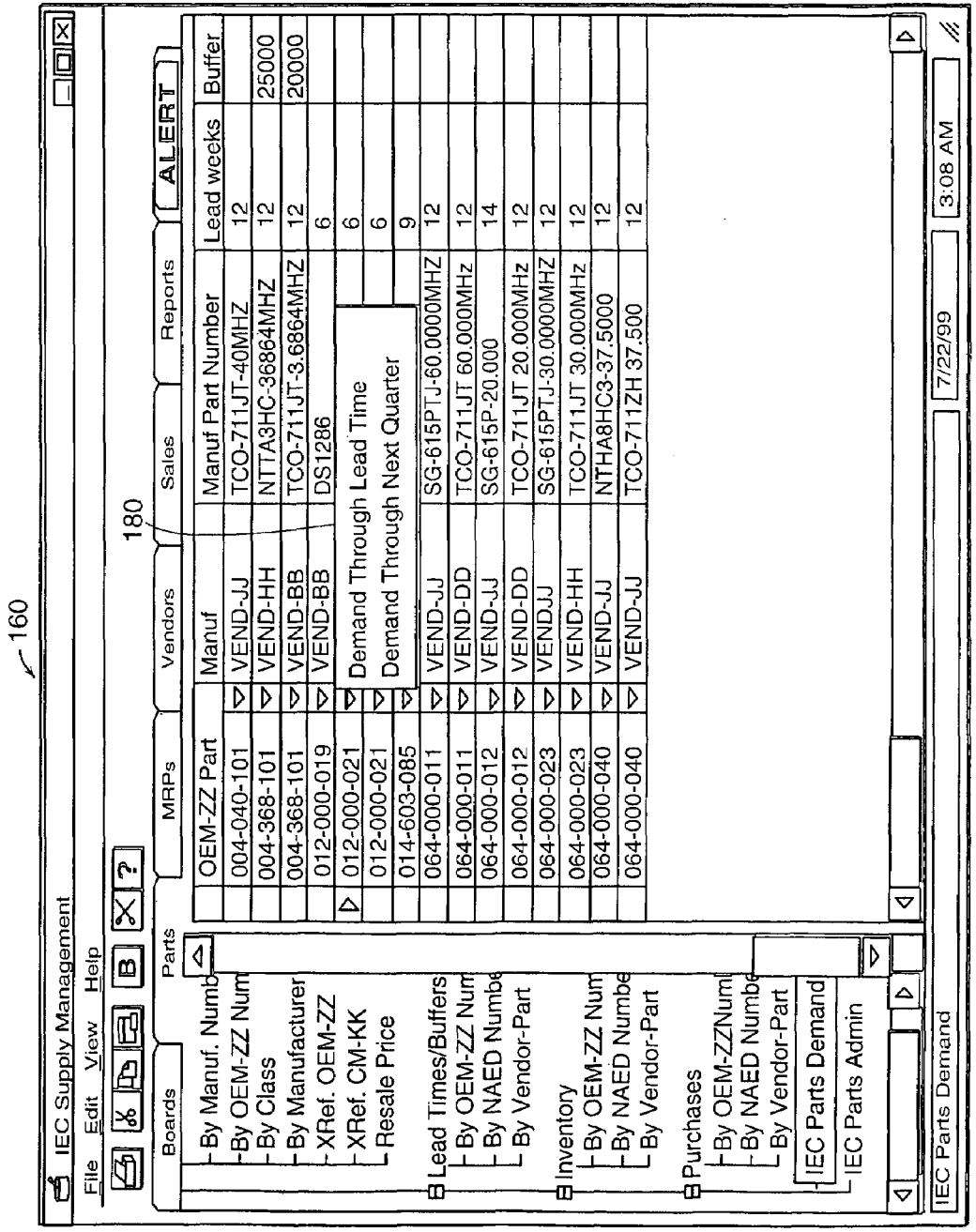
FIG. 5B is a screen shot similar to that of FIG. 5A, showing the associated pull-down menu.

As FIG. 5B shows, each line has a corresponding pull-down menu 180, through which a user can select detailed information such as "Demand Through Lead Time" or "Demand Through Next Quarter."

In FIG. 5C, the user has selected "Demand Through Lead Time" for the OEM's part number 012-000-021, and specifically, the manufacturer's part number DS 1232S/TR/OEM-ZZ, which has a lead time of 6 weeks.

Detailed information for this part number is displayed, including, for example, MRP Origin 192, which has the same meaning as "Origin" 144 in the screen of FIG. 3C, the contract manufacturer 194 and those OEM's boards 196 which use the OEM's generic part 012-000-021, or, alternatively, boards that specifically use the vendor's DS1232S/TR/OEM-ZZ part.

The Week 31–35 columns 198 show quantities related to the part number, needed for each week for the particular board. Additional week columns are off-screen, but can be scrolled into view.

Totals for each week are shown in the bottom row 199.

Figure 6:
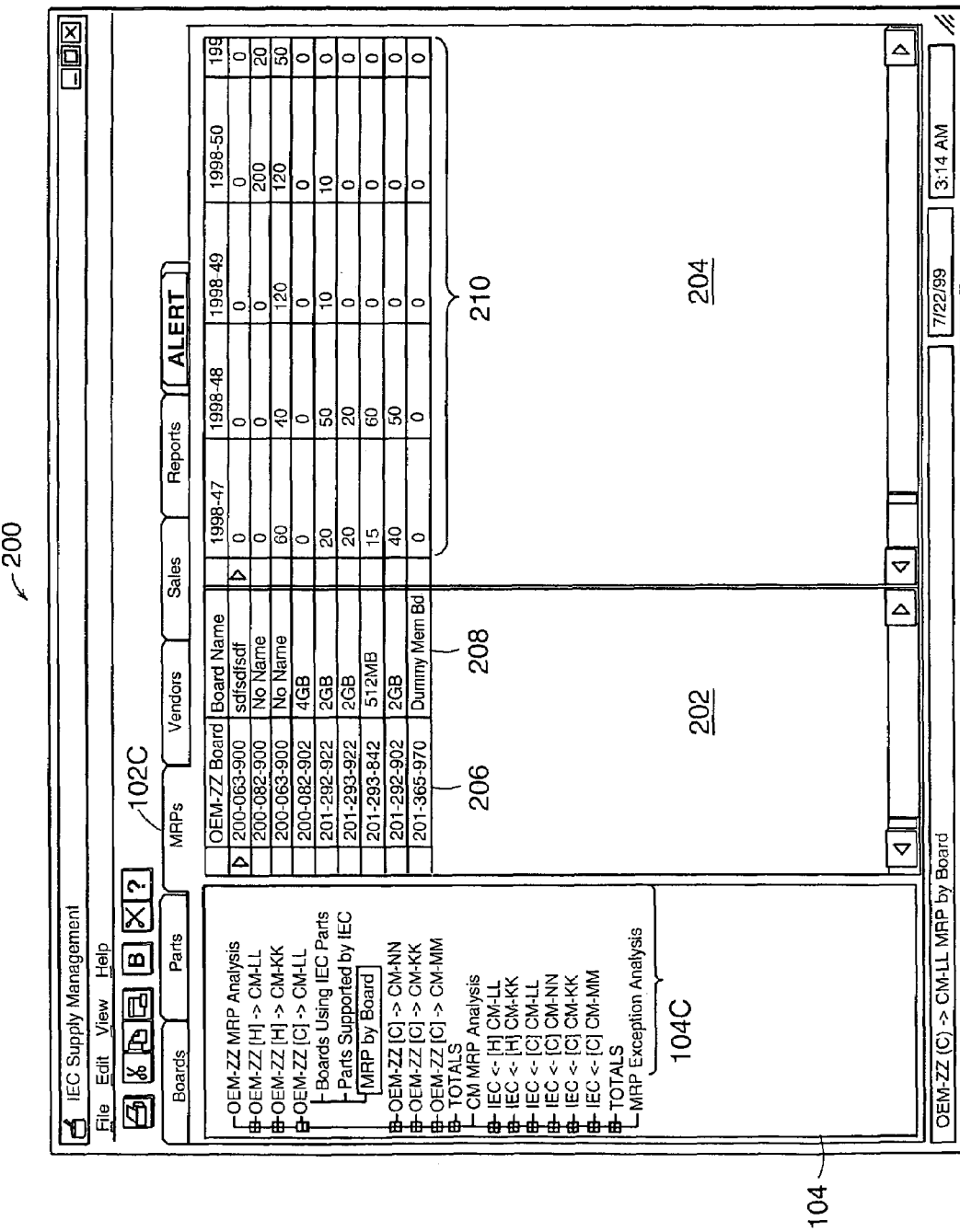
FIG. 6 is a screen shot of MRP data by board.

FIG. 6 is a screen view 200 of MRP data by board, obtained by selecting the MRPs tab 102C. A variety of MRP-related filters 104C are available, providing a large degree of analysis of the supply chain data. Using these filters, for example, a match between the OEM's demand and the CM's demand as placed on the distributor/vendor can be easily shown.

Here, "OEM-ZZ (C)->CM-LL, MRP by Board" has been selected, indicating a desire by a user to review all boards ordered from contract manufacturer CM-LL for orders placed on it by, for example, the branch of the OEM indicated by "(C)".

The data shown includes each qualifying circuit board part number 206, the name, if any, given to each circuit board 208, and quantities 210 for, in this example, each week.

Figure 7A:
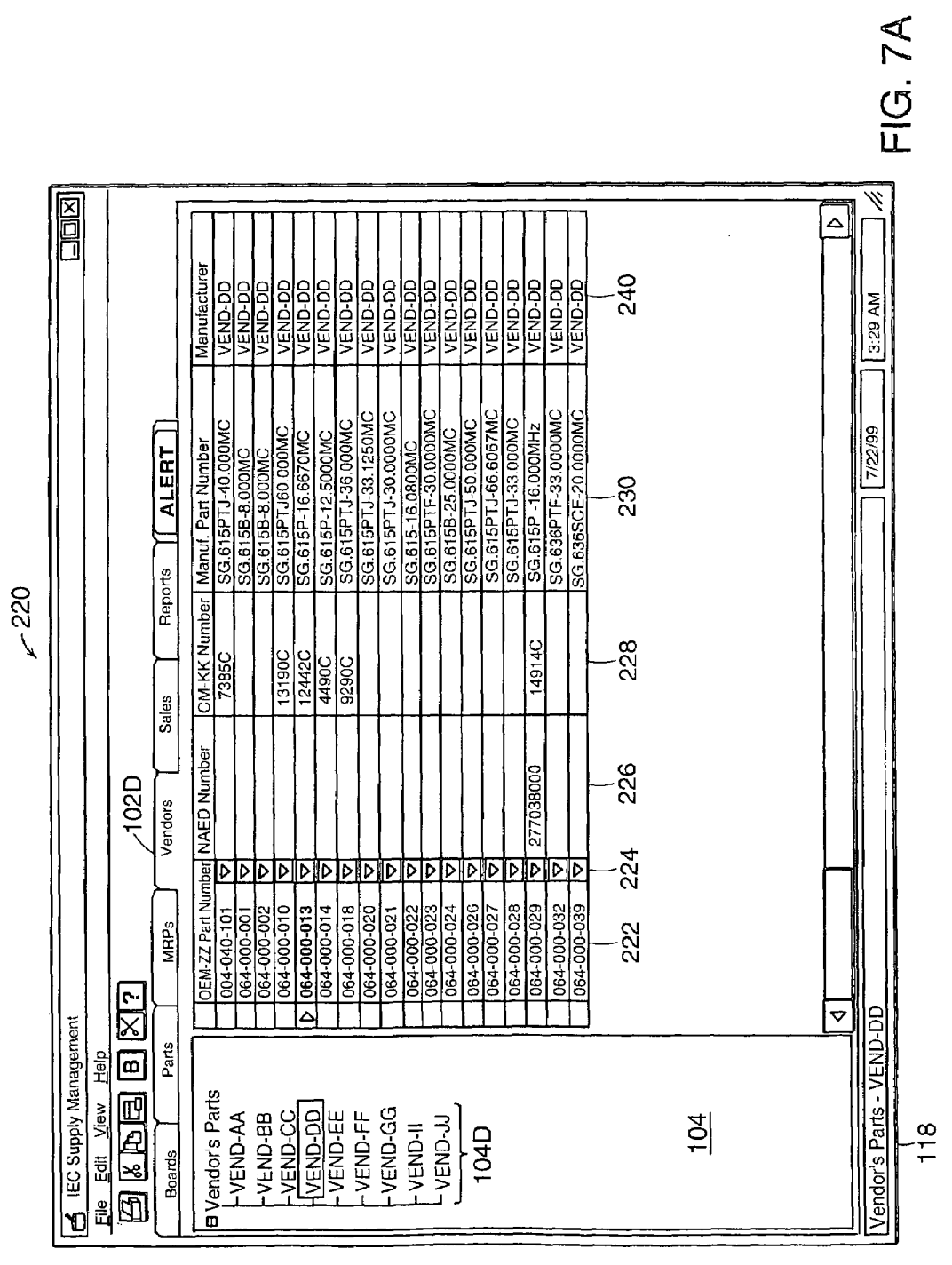

Similarly, FIG. 7A is a screen view 220 of vendor data, displayed when the Vendors tab 102D is selected. Various filters 104D, available according to vendor, are selectable. The selected filter, VEND-DD, is highlighted. Data shown includes circuit board part number 222, NAED number 226, contract manufacturer CM-KK's part number 228, a manufacturing part number 230, and the manufacturer name 240.

Figure 7B:
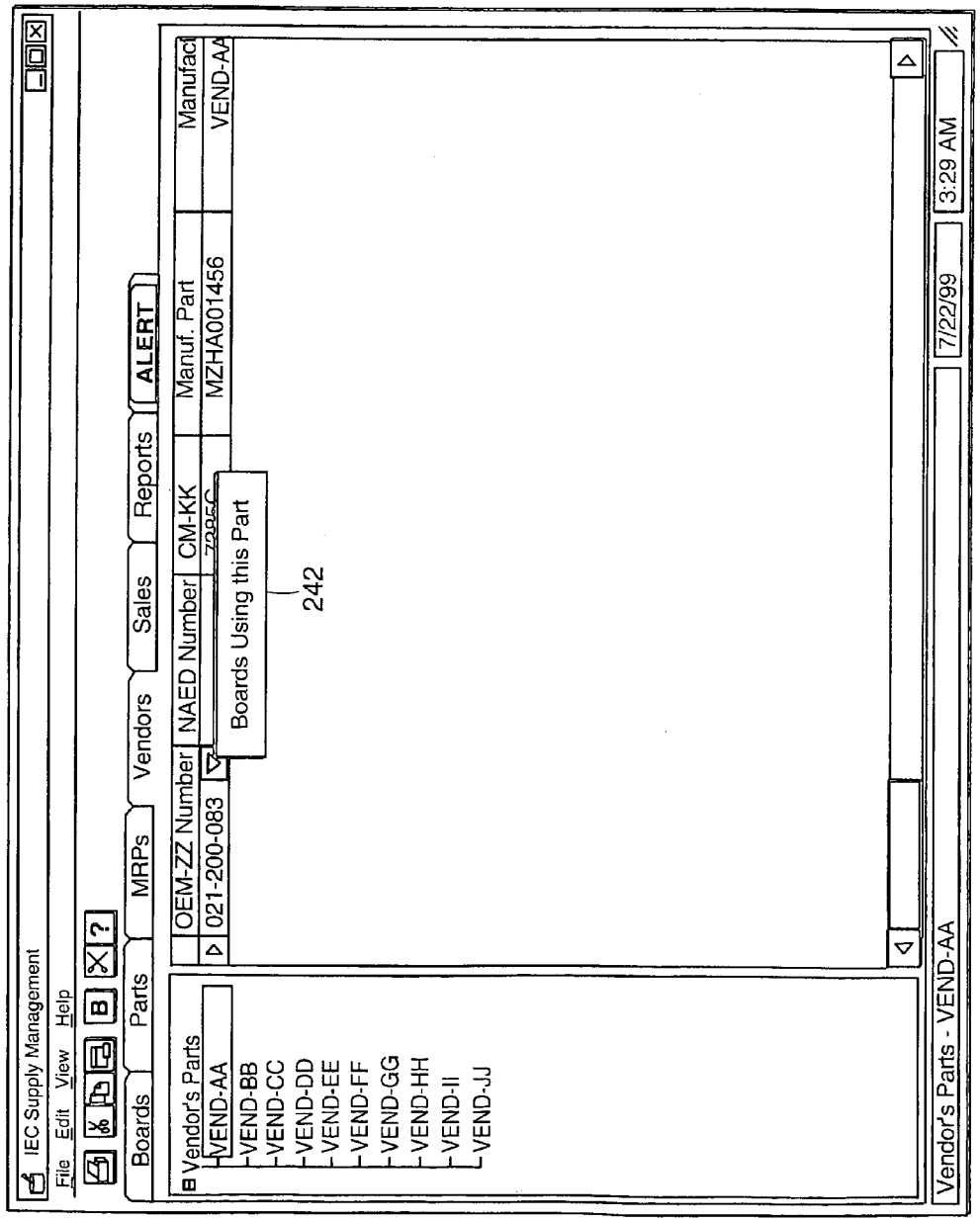
FIG. 7B is a screen shot similar to that of FIG. 7A, showing the associated pull-down menu.

In FIG. 7B, a pull-down menu 242 is available for each OEM part number, by clicking on the arrow 224 (FIG. 7A) next to the part number, allowing the user to see all boards using that part.

FIG. 8 is a screen view 250 of sales data, which is displayed when a user selects the Sales tab 102E. A variety of sales-related analysis filters 104E are provided. In the illustrated example, "Sales-By NAED Number" has been selected. Several columns of sales-related data are displayed, including CM 252. The first column 252 is labeled with the name of the OEM, here "OEM-ZZ". Preferably, each account or location for a CM has a different name. For example, CM-LL8 is a specific account for vendor CM-LL.

Other columns include order number 254 from the CMs to the distributor, the NAED-assigned part number 256, discussed previously, the vendor's part number 258, customer part number (PN) 260 corresponding to the OEM's part number and a quantity ordered 262 and quantity shipped 264. Note that the OEM is normally that entity that has "the customer number".

A CM Terms Admin selection allows an authorized user to perform administrative functions. Such functions can serve to quantify business rules to a CM, including such terms as scheduling, buffer inventory and liability.

Figure 9:
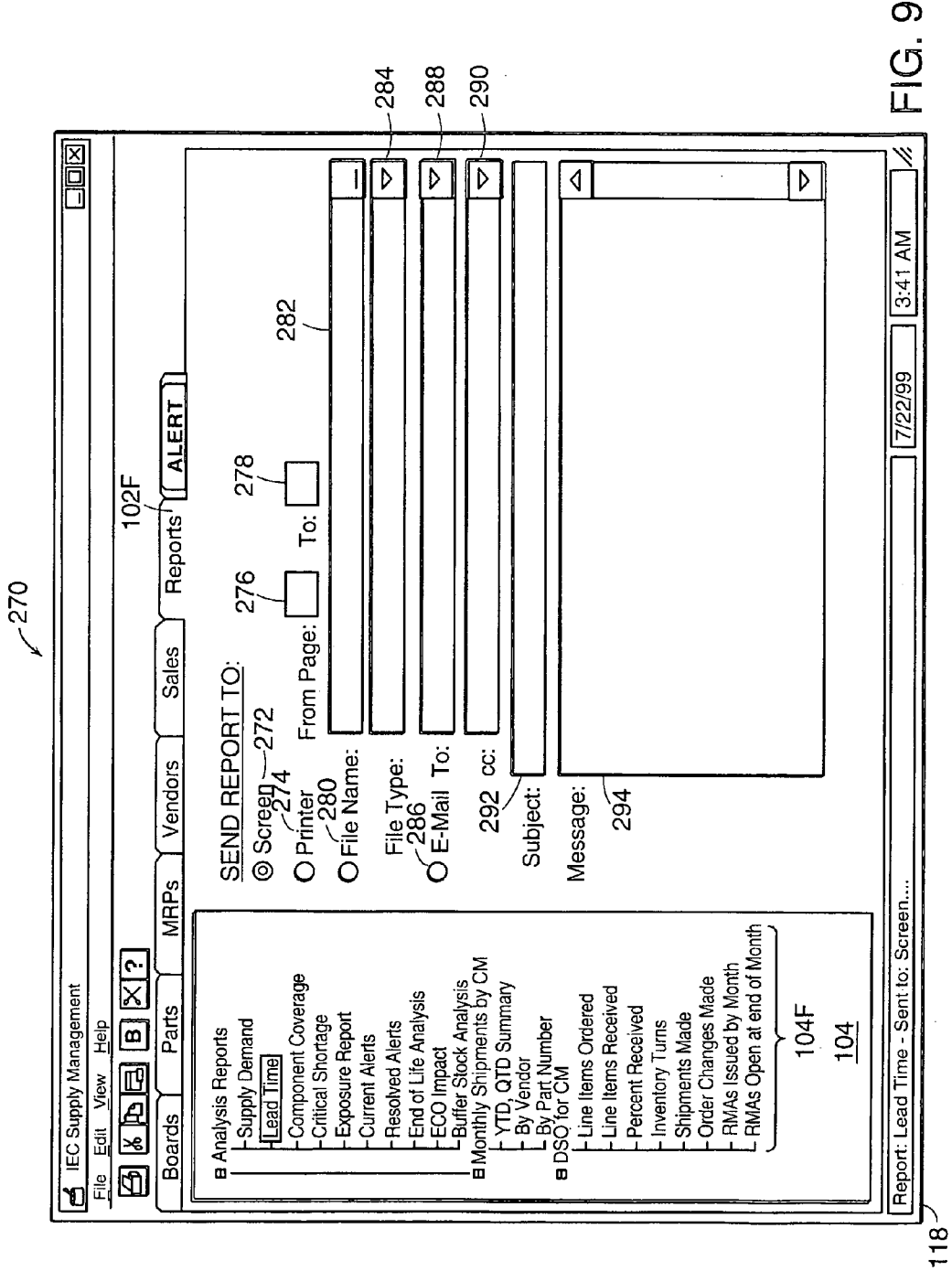
FIG. 9 is a screen shot of the reports ordering window.

FIG. 9 is a view of the reports ordering window 270, displayed upon selection of the Reports tab 102F. A variety of analysis reports 104F, arranged hierarchically by topic, is available. Topics can include, but are not limited to, analysis reports, monthly shipment reports and day sales outstanding (DSO) reports.

A selected report can be sent to the screen, to a printer, to a file, or to a person via email, by selecting the respective button 272, 274, 280, 286. "From page" and "To" fields 276, 278 allow the printing of only selected pages. File Name and File Type fields 284, 288 allow the designated report to be named and saved in a variety of formats. To, cc:, Subject and message fields, 288, 290, 292 and 294 respectively, allow the user to specify recipients of the report, and to add a subject and remarks.

Note that in FIG. 9 a lead time analysis report has been selected in the filtered 104f, and send report to screen 272 has been selected.

Figure 10:
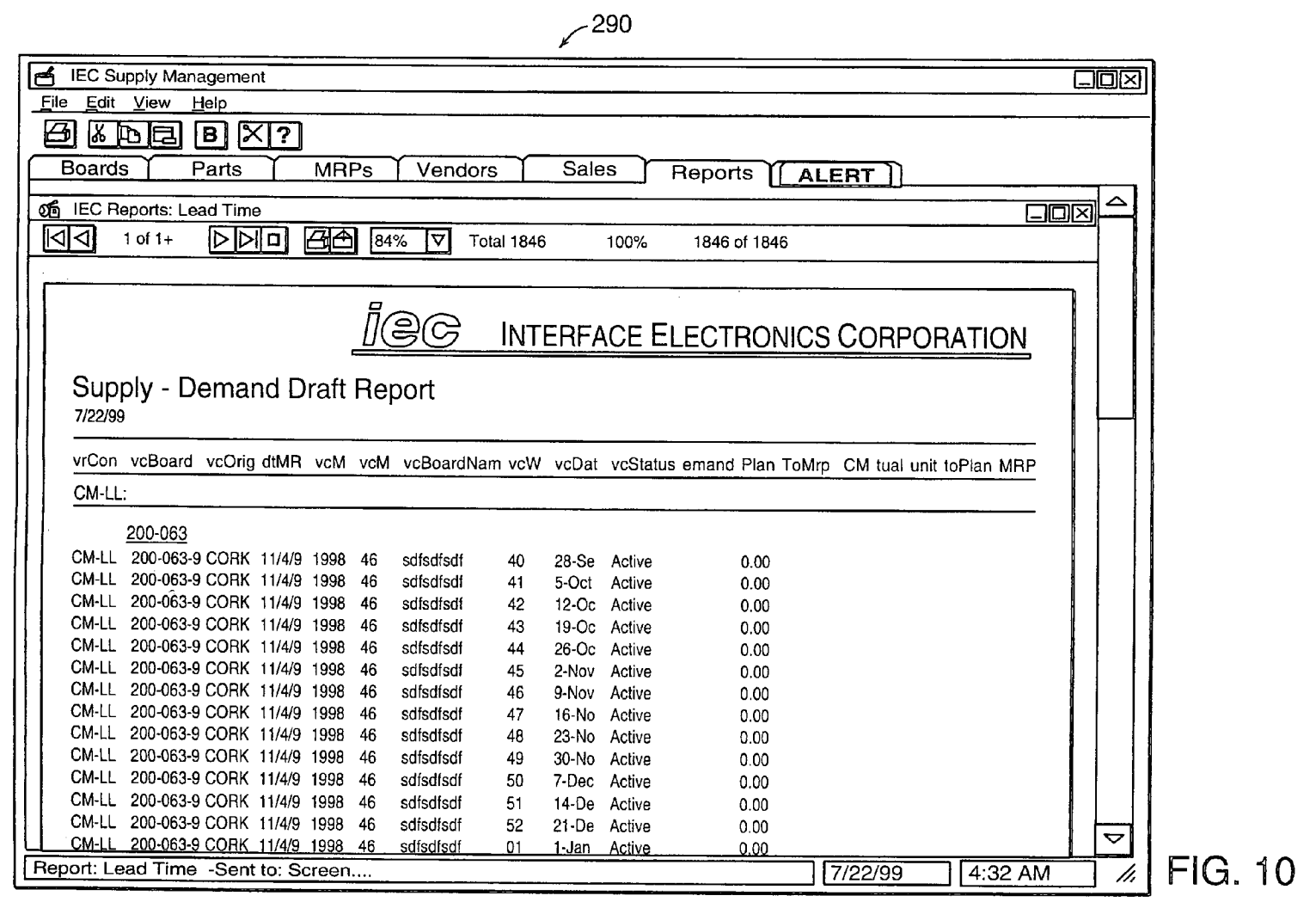

FIG. 10 is a screen shot 290 of a typical report sent to the screen for the lead time report requested in FIG. 9.

Figure 11A:
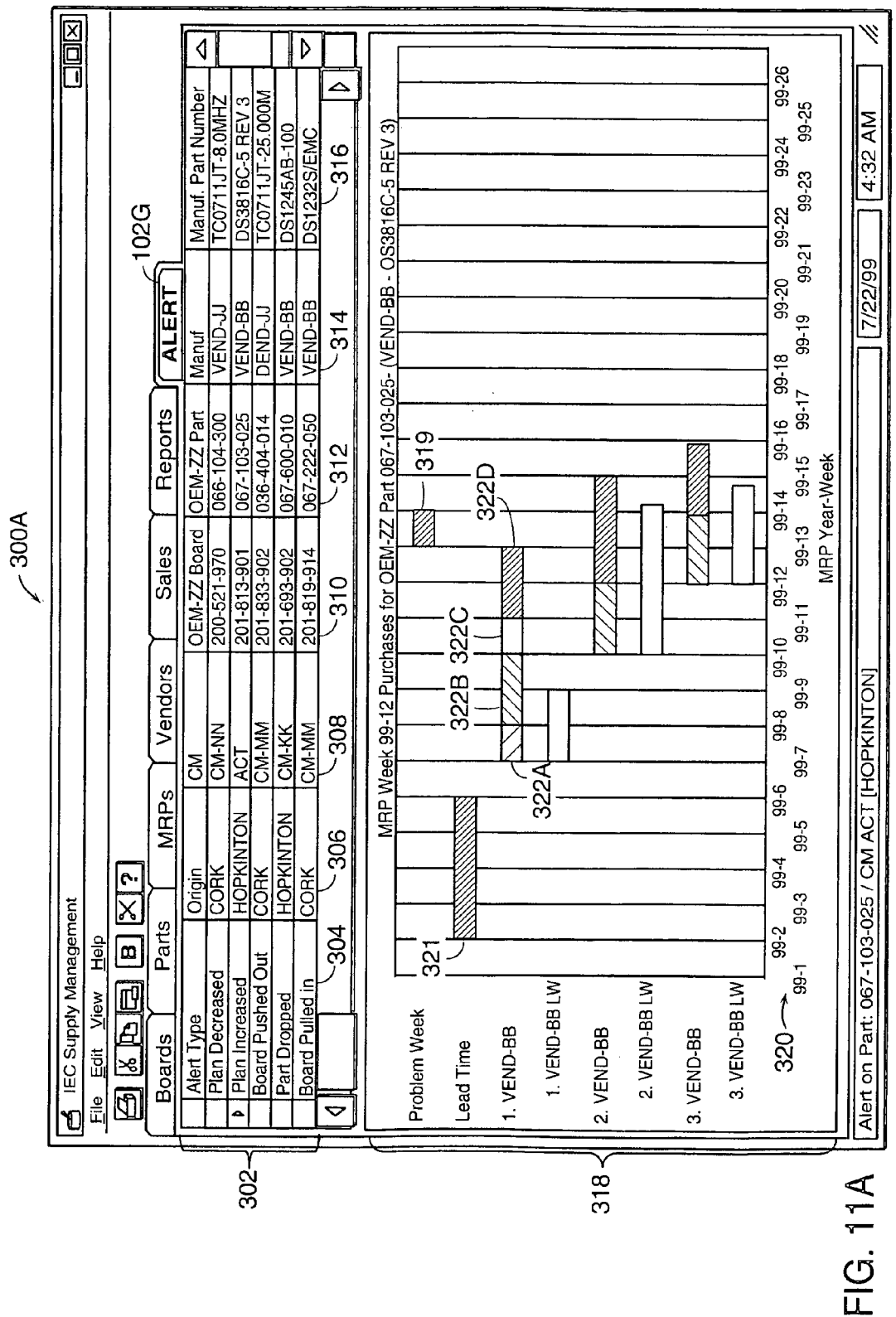
FIGS. 11A-11C are screen shots of the alert window of the present invention.

The present invention traps conditions that will create problem situations for the networked partners. When looming conditions of surplus or shortage become apparent by looking ahead at supply and demand, an alert is raised by coloring the Alert tab 102G bright red. Of course, in alternate embodiments, a flag or other icon, or, for example, an audible signal, could be used as well to indicate alert conditions. The screen 300A shown in FIG. 11A is displayed upon selection of the Alert tab 102G.

The alert window 300A is divided into two sections. The upper portion 302 lists current alert conditions by alert type 304, origin 306, CM 308, the OEM's number for the affected board 310, the OEM's part number for the actual part causing the alert of column 312, the manufacturer of the part 314 and the manufacturer's part number 316.

The lower portion 318 of the window 300A shows details of the currently selected alert condition 302A in graphical form. Bars are preferably color coded. For example, bar 322A could be light blue to indicate some status, while bar 322B could be green to indicate another status, bar 322C could be yellow to indicate yet another status, and bar 322D is red to indicate alert status. Bar 321, indicating lead time, is dark blue. While different colors can be used, red is preferred for alert conditions to catch a user's attention. In particular, red preferably indicates trouble on a lead time for a defined part number. Other colors are for differentiation of lead-time periods.

In one embodiment, a bar is red to indicate that a product is overdue and not received. The left side of a bar indicates when a product is first due, while the right side of the bar indicates when all product is due. A green bar, on the other hand, indicates the period during which product is expected to be timely received. The left side of a green bar coincides with placement of an order. If a full shipment is received the entire bar is green. The right side of the green bar indicates the final receipt of a product.

Liability windows (LW) are also shown, defining a period of time within which the distributor will be liable for the procurement of the subject part if an order is cancelled. This period is indicated by the width of the LW bar, which in one embodiment is yellow. If the distributor cancels outside that timeframe, then no liability exists. Liability windows can differ among part number and by vendors. When a user clicks on a LW bar, a number of day(s) of the LW appears in a pop-up window. Since this number defines the LW, the distributor can cancel any quantity due without liability if such cancellation is for product due beyond the right side of the LW bar.

As this example suggests, an unexpected production plan increase is impacting the supply chain. Here, the problem week, week 13 of 1999 as indicated by bar 319, is viewed in relation to the purchases that have been made for that part. Details of each bar include, for example, purchases, deliveries, and delays that can conspire to aggravate a demand condition.

Individual line items, such as 302A or 302B, can also be color coded to indicate a particular status.

Similarly, any of the lines containing boards or part information, as depicted for example in any of FIGS. 3A–8, can also be color-coded to indicate status, in particular, an alert condition. Either the background or the text itself can be color coded.

Figure 11B:
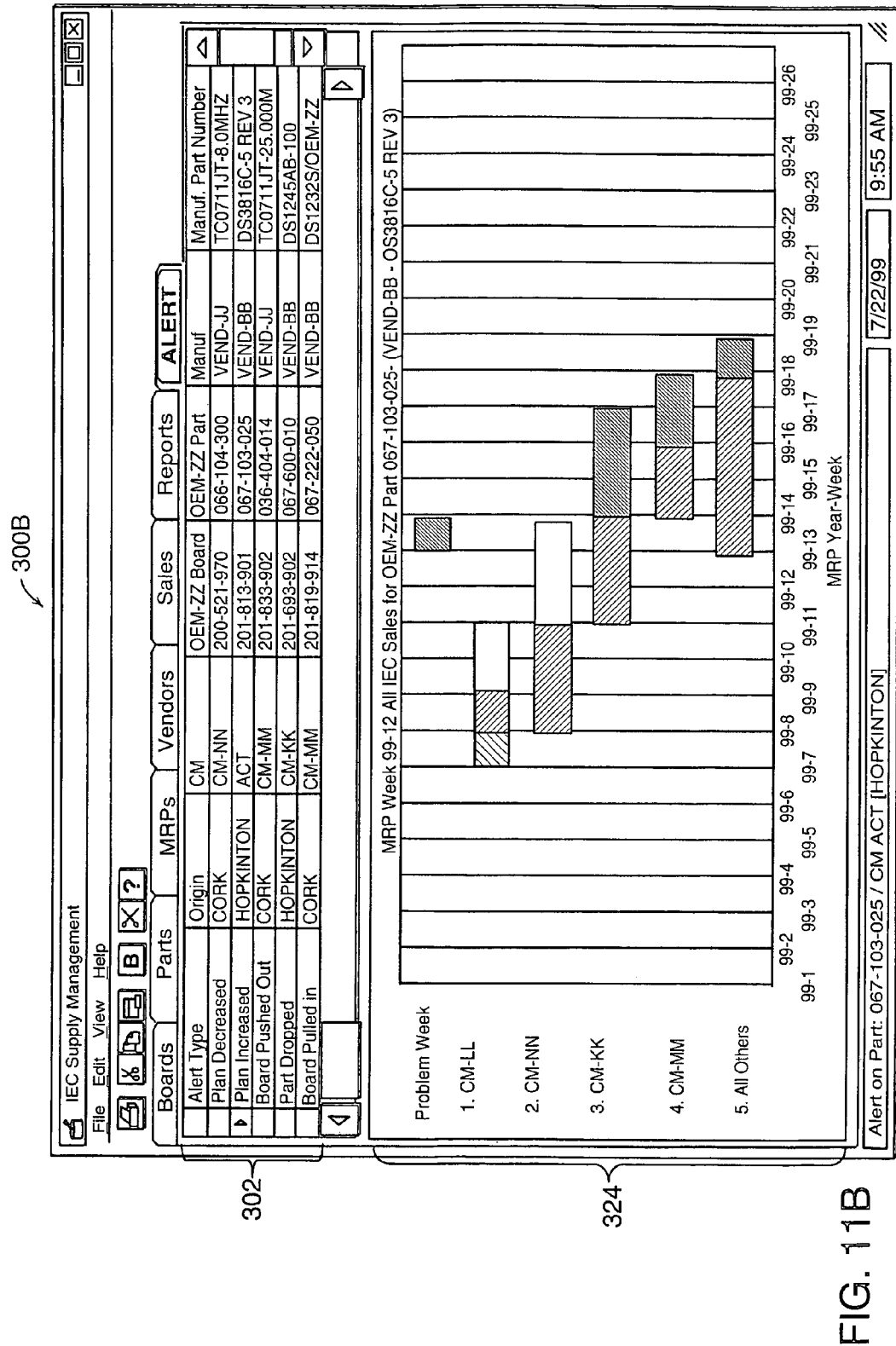
Figure 11C:
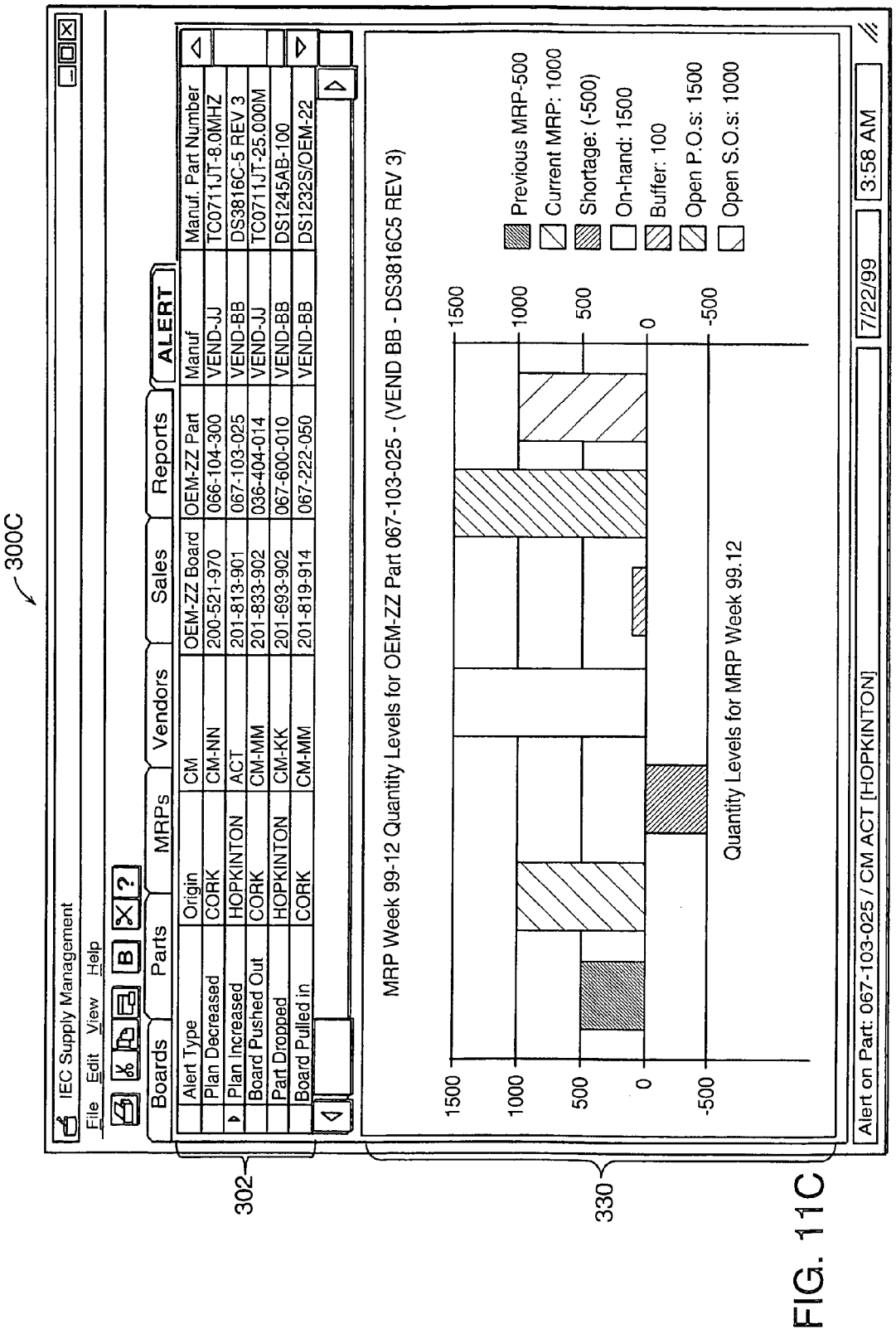
Figure 11D:
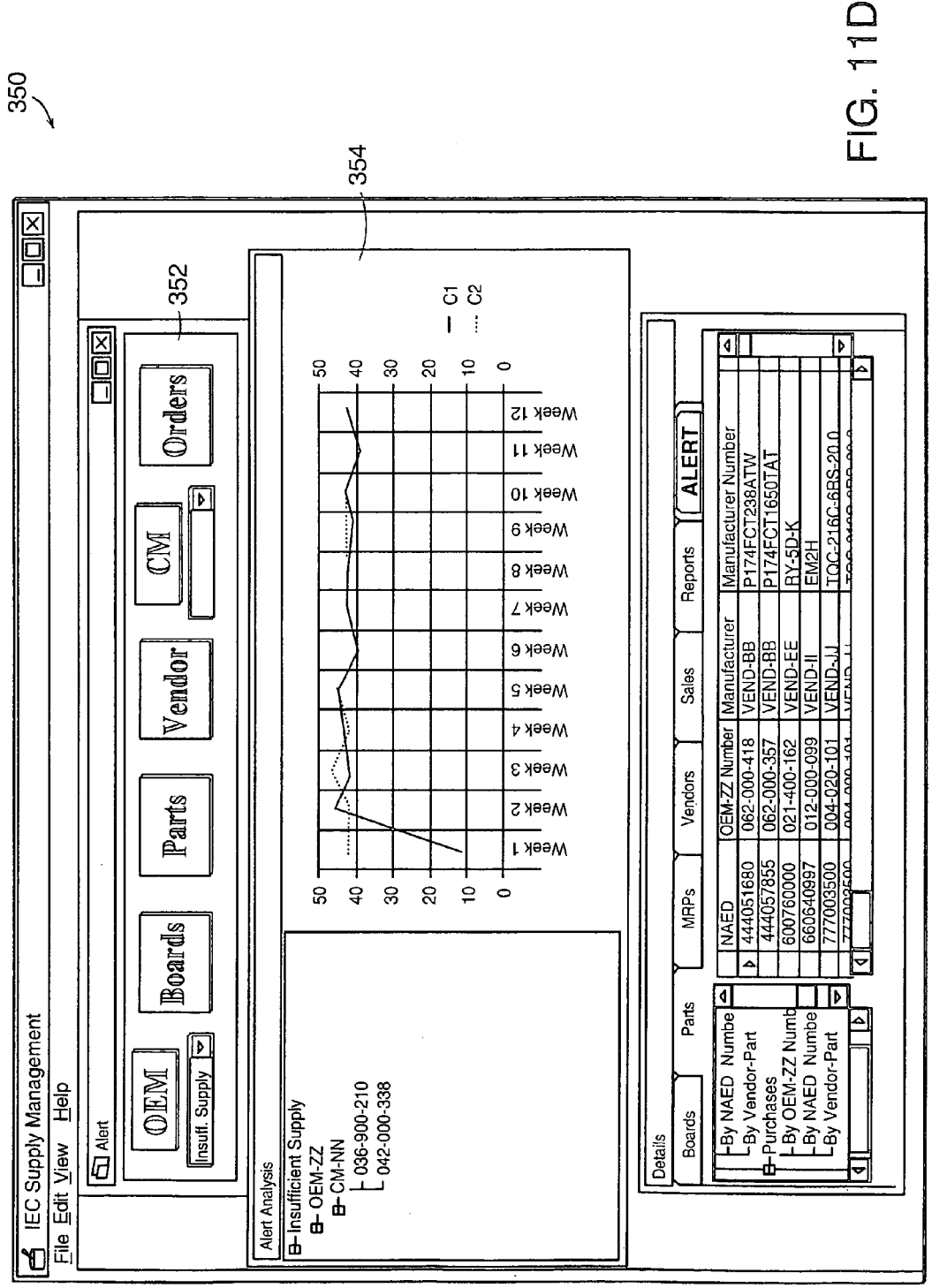
FIG. 11D is a screen shot of an alternate alert window for use with the present invention.

In one embodiment, navigating to the screens depicted in FIGS. 11B, 11C and 11D is done by clicking the right mouse button on a blank part of the screen of FIG. 11A. A pop up window appears (not shown). The user selects "sales" to go to the screen of FIG. 11B, or "quantities" to go to the screen of FIG. 1C or FIG. 11D.

Also, by clicking on a bar 322D on the graph 318, the screen 300B of FIG. 11B is displayed. This view displays the same problem event in the context of sales of the product that can yield an unattainable obligation unless measures are taken immediately.

In FIG. 11C, the bottom portion 330 of the screen 300C shows quantity levels for the problem part. Preferably, the different quantities are color-coded. The available data analysis can make visible the resulting expected shortage that too often occurs, and meets with an untimely response that has already broken the efficiencies of the manufacturing process.

Current MRP is the MRP data that was last received. Previous MRP is the MRP information received just before the last. Changes to the MRP can be viewed here. In this example, the previous MRP called out for 500 pieces, while the current calls out for 1000 pieces. Thus, a 500-piece shortage has been created.

On-hand is inventory, and is preferably categorized by each distributor, the CM's and the vendors. It is important to have access to all stock positions on an ongoing basis.

FIG. 11D presents an alternate alert screen view for use in one embodiment of the present invention. Panel 352 allows a user to view alerts pertaining only to certain vendors or parts, etc. In addition, rather than using bars to portray data, a graph 354 is used.

Figure 12:
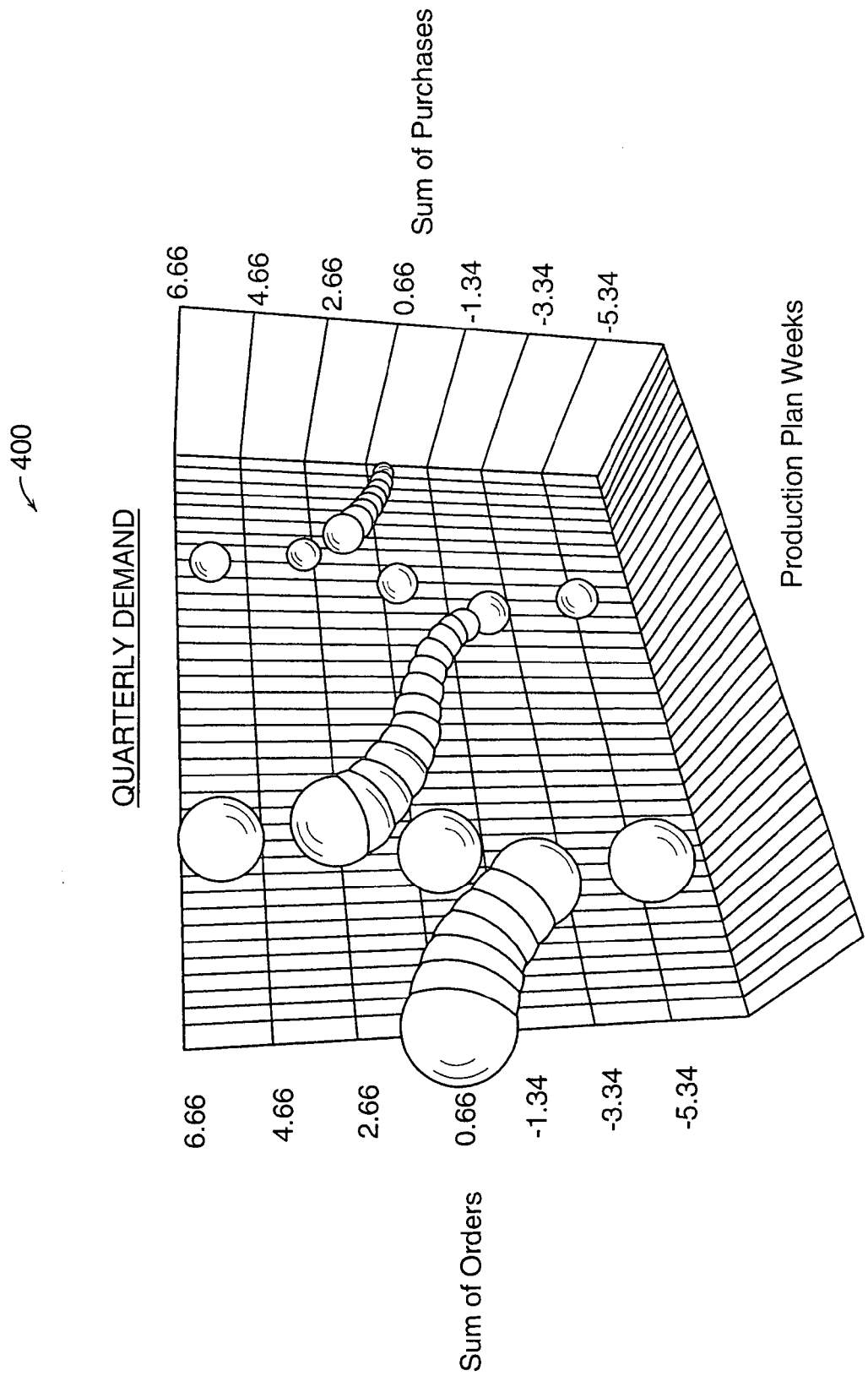
FIG. 12 is a graph illustrating the use of animation by the present invention to present data.

FIG. 12 is a graph 400 illustrating the use of animation by the present invention to present data. The present invention is based upon state of the art technologies that lend themselves to analysis and modeling of trends. This affords a novel opportunity to put the aggregate data to use in viewing the dynamics of the supply chain.

The graph 400 can be viewed by selecting an icon in a toolbar (not shown). By clicking on a "play" button (not shown) next to the graph 400, the user is presented with multi-dimensional views of the data, including animations of the data over time, which enable the discovery of conditions that can be smoothed to the advantage of all partners in the supply chain.

In FIG. 12, the sum of orders is negative when there are not enough orders to fulfill requirements.

With the analysis tools described above, if a vendor does not have a sufficient quantity of parts, the distributor can easily find a CM who has surplus parts to sell to another CM who needs the parts.

The present invention provides feedback to CMs and vendors, pointing out their weak spots, and showing where they can strengthen their position by cleaning up their data.

While the present invention has been shown in a distributor's supply chain, it can also be used anywhere there is a supply chain, such as in retail, wholesale, the food industry, etc.

It will be apparent to those of ordinary skill in the art that methods involved in the present system for monitoring a supply chain may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of monitoring supply chain activity, comprising:
   scanning for changed supply-related data at independent supply chain sites within the supply chain;
   extracting the supply-related data at the independent supply chain, the data being maintained in plural formats at the supply chain sites, where each of the supply chain sites represents an independent entity in the supply chain;
   translating the extracted data into a common format;
   uploading the extracted data from each supply chain site to a data collection site, the data collection site collecting the extracted data; and
   upon a request from a user associated with one of the supply chain sites,
      formatting, at the data collection site, a portion of the collected data, retrieved from one of the supply chain sites other than the site of the user, into one of a plurality of views, responsive to criteria selected by the user, for presentation to the user, the portion of formatted data being dependent on access rights granted to the user's supply chain site, and
      publishing the formatted data view to the user's supply chain site; at the data collection site, monitoring inbound data from multiple supply chain sites;
   detecting a problem condition if there is a surplus or shortage in the collected data retrieved from at least one of the supply chain sites other than the site of the user; and
   responding to the problem condition by asserting an alert to the user, where the alert indicates a problem condition associated with at least one of the supply chain sites other than the site of the user.

2. The method of claim 1 wherein the data is translated at each supply chain site before uploading.

3. The method of claim 1 wherein the data is translated at the data collection site after uploading.

4. The method of claim 1, further comprising, at each supply chain site:
   scanning for new or changed data at regular intervals; and
   uploading upon finding new or changed data.

5. The method of claim 1, wherein at least one format is a spreadsheet.

6. The method of claim 1, wherein at least one format is a relational database.

7. The method of claim 1, wherein at least one format is a text file.

8. The method of claim 1 wherein at least two formats at one or more supply chain sites are different.

9. The method of claim 1 wherein data comprises inventory data.

10. The method of claim 1 wherein data comprises purchase orders.

11. The method of claim 1 wherein data stored at the supply chain sites is stored in legacy database systems.

12. The method of claim 1 wherein raising an alert comprises highlighting an Alert indicator on a user screen.

13. The method of claim 12 further comprising, upon selection of the highlighted Alert indicator by a user:
   displaying details of the detected problem condition.

14. The method of claim 13 wherein the details of the detected problem condition are displayed in a graphical format.

15. The method of claim 1 further comprising:
   using animation to present the data to a user.

16. The method of claim 1, wherein the supply chain sites further includes contract managers (CMs), vendors, distributors and an original equipment manufacturer (OEM).

17. The method of claim 1, further comprising:
   encrypting the data before uploading.

18. The method of claim 1 wherein uploading is over the Internet.

19. The method of claim 1 further comprising:
   providing, to the data collection site, materials requirements information for a product at any or all stages in the product's lifecycle.

20. The method of claim 1, further comprising:
   generating an analysis report responsive to report selection by a user; and
   providing the generated report responsive to user selection of report destinations.

21. The method of claim 20, wherein providing the generated report comprises at least one of emailing, printing, storing as a file or displaying on a monitor or a screen, the report.

22. A system for monitoring supply chain activity, comprising:
   a data collection center, comprising
      a data collector; and
      a publisher for publishing data from the data collector upon request; and
   a plurality of independent supply chain sites within the supply chain, each supply chain site representing an independent entity in the supply chain, comprising:
      a data storage device for maintaining supply-related data;
      a data transfer engine (DTE) which detects changed supply-related data at the data storage device, extracts the supply-related data from the data storage device and transfers the extracted data to the data collection center;
      input means for allowing a user associated with a supply chain site to query the data collector for supply-related data retrieved from one of the supply chain sites other than the site of the user;
      a display for displaying data published by the publisher in response to a query; and
      an alert indicator which indicates an alert condition if there is a surplus or shortage associated with one of the supply chain sites other than the site of the user in the supply chain.

23. The system of claim 22, wherein the data collector is a database.

24. The system of claim 22, wherein data stored at a supply chain site is stored in at least one of a database, a spreadsheet, and a text file.

25. The system of claim 22 wherein the DTE comprises encryption means for encrypting the data before transferring.

26. The system of claim 22 wherein data is displayed in a window on the display at a site according to a category selected by a user at the site, responsive to authorization granted to the site.

27. The system of claim 26 further comprising, for each category, at least one analysis filter selectable by the user for setting criteria to be used in filtering the data to be displayed.

28. The system of claim 27 wherein filtering comprises sorting.

29. The system of claim 27 wherein filters are organized hierarchically.

30. The system of claim 26 further comprising, in each window, including the alert indicator for indicating the existence of an alert condition.

31. The system of claim 30, wherein the alert turns red to indicate the existence of an alert condition.

32. The system of claim 30, where an alert condition indicates a shortage.

33. The system of claim 30, where an alert condition indicates a surplus.

34. The system of claim 30 wherein alert conditions are represented in graphical form.

35. The system of claim 34 wherein alarm conditions and lead times are color-coded.

36. The system of claim 34 wherein when the user clicks in the graphical representation, detailed information about the alert is displayed.

37. A system for monitoring supply chain activity comprising a plurality of supply chain sites, comprising:
  means for monitoring changed supply-related data at independent supply chain sites within the supply chain;
  means for extracting, at each supply chain site, the supply-related data to be monitored, wherein the data is maintained in plural formats located among the supply chain sites, at least one of the supply chain sites corresponding to an independent entity in the supply chain, being independent of another supply chain site;
  means for translating the data to a common format;
  means for uploading and collecting, from each supply chain site, the extracted data to a data collection site;
  means for formatting, at the data collection site, a portion of the collected data, retrieved from at least one of the supply chain sites other than the site of the user, into one of a plurality of views, responsive to criteria selected by a user associated with a supply chain site, for presentation to the user, the portion of formatted data being dependent on access rights granted to the user's supply chain site;
  means for publishing the formatted data view to the user's supply chain site;
  means for monitoring, at the data collection site, inbound data from multiple supply chain sites;
  means for detecting a problem condition if there is a supply chain surplus or shortage detected in the collected data retrieved from at least one of the supply chain sites other than the site of the user; and
  means for responding to the problem condition by asserting an alert, where the alert indicates a problem condition associated with at least one of the supply chain sites other than the site of the user.

38. A method of monitoring supply chain activity, the supply chain having a plurality of supply chain sites, the method comprising:
  establishing a communications link between a first supply chain site and a data collection center;
  installing a data transfer engine (DTE) in the first supply chain site, the first supply chain site being independent of a second supply chain site in the supply chain, the first supply chain site maintaining proprietary supply chain information in a format that is different from a format in which the second supply chain site maintains proprietary supply chain information, the DTE;
  in response to detecting changes in the respective proprietary information at the first supply chain site, triggering an event by:
  extracting the respective proprietary supply-related information from the first supply chain site, and
  forwarding, over the communications link, the extracted proprietary information to a data collection center;
  monitoring the proprietary information for problem condition, the problem condition resulting from a surplus or shortage in the extracted proprietary information from the first supply chain site; and
  responding to a problem condition by asserting an alert to the second supply chain site.

39. The method of claim 38 wherein the monitoring at the DTE the respective proprietary information of the first supply chain site for changes, and the triggering event being responsive to detecting a change to the respective proprietary information.

40. The method of claim 38, the triggering event being the end of a time period.

41. The method of claim 38, the triggering event being a request from the data collection center.

42. The method of claim 38, the link comprising any or all of: Internet; a dial-up connection; and a virtual private network.

43. The method of claim 38, the forwarded data being formatted using a formatting language.

44. The method of claim 43, wherein the formatting language is XML.

45. The method of claim 38, the DTE being implemented in software.

46. The method of claim 38, the DTE further:
  prior to forwarding selected data to the data collection center, translating the selected data to a common format accepted by the data collection center.

47. The method of claim 38, the data collection center analyzing the supply chain based on proprietary information from at least the first and second supply chain sites, all proprietary information having been translated into the common format.

48. The method of claim 38, the data collection center analyzing the supply chain based on proprietary information from at least the first and second supply chain sites.

49. The method of claim 38, wherein the proprietary information includes any or all of orders, lead times, inventory, enterprise resource planning data, material resource planning data, and purchasing information.

50. A method of monitoring, at a data collection center, supply chain activity, the supply chain including a plurality of supply chain sites, the method comprising:
  scanning for changed supply-related information at independent supply chain sites within the supply chain;
  receiving, from at least two of the independent supply chain sites corresponding to independent entities in the supply chain, supply-related information, said information being extracted from said supply chain site and being proprietary as to that supply chain site, the supply chain sites maintaining their respective proprietary information in different formats;
  storing the received information in a database, in a common format;

receiving, from a user at a first supply chain site of the plurality of supply chain sites, a request for information from one or more of the supply chain sites other than the site of the user; and in response to the request,
    formatting requested information into one of a plurality of views, the information provided being dependent on access rights granted to the user's supply chain site,
    performing an analysis of the supply chain based on the information received from the plural supply chain sites to determine if there is a surplus or shortage in the supply chain associated with one or more of the supply chain sites other than the site of the user,
    asserting an alarm condition resulting from the analysis, and
    forwarding the formatted view to the user.

51. The method of claim 50, wherein proprietary information is received from at least one supply chain site in the common format, said proprietary information having been translated to the common format at the supply chain site.

52. The method of claim 50, herein proprietary information is received from at least one supply chain site in the supply chain site's proprietary format, the method further comprising:
    translating said received proprietary information into the common format.

53. A method of monitoring supply chain activity, the supply chain comprising a plurality of supply chain sites, at least two supply chain sites being independent of each other representing independent participants in the supply chain, the method comprising:

at each supply chain site:
    maintaining proprietary supply chain information in a format that is different from a format in which at least one other supply chain site maintains its proprietary supply chain information,
    extracting selected proprietary supply-related information, and
    upon a triggering event in response to detecting changes in the proprietary supply-related information, forwarding the extracted proprietary information to a data collection center that operates independently of the supply chain site; and at the data collection center:
    receiving, from each supply chain site, the respective forwarded proprietary supply chain information,
    storing the received information in a database, in a common format,
    receiving, from a user at a first supply chain site of the plurality of supply chain sites, a request for information concerning a supply chain site other than the site of the user, and
    in response to the request,
        formatting requested information into one of a plurality of views, the information provided being dependent on access rights granted to the user's supply chain site,
        performing an analysis of the supply chain based on the information received from the plural supply chain sites to determine if there is a surplus or shortage in the supply chain asserting an alarm condition resulting from the analysis, where the alarm condition indicates a problem concerning the supply chain site other than the site of the user; and
        forwarding the formatted view to the user.

54. A method of monitoring supply chain activity, the method comprising:
    from a plurality of independent supply chain sites, extracting proprietary supply-related information into a common format, where at least one of supply chain sites corresponds to a vendor and at least one of supply chain site corresponds to a distributor;
    at the supply chain sites, monitoring the proprietary information to detect any changes;
    receiving a request, from the vendor supply chain site, for supply chain information concerning the distributor supply chain site;
    in response to the request, providing a portion of the proprietary information extracted from the distributor supply chain site, where the provided portion is based on access rights granted to the vendor supply chain site; and
    responding to a change detected in the proprietary supply chain information extracted from the distributor supply chain site by asserting an alert at the vendor supply chain site.

55. The method of claim 54, wherein the supply chain sites further include contract managers (CMs), and an original equipment manufacturer (OEM).

* * * * *

US006947903C1

(12) EX PARTE REEXAMINATION CERTIFICATE (7450th)

United States Patent
Perry

(10) Number: US 6,947,903 C1
(45) Certificate Issued: Apr. 6, 2010

(54) METHOD AND SYSTEM FOR MONITORING A SUPPLY-CHAIN

(75) Inventor: Brian M. Perry, Upton, MA (US)

(73) Assignee: elcommerce.com Incorporated, Franklin, MA (US)

Reexamination Request:
No. 90/009,298, Oct. 3, 2008

Reexamination Certificate for:
Patent No.: 6,947,903
Issued: Sep. 20, 2005
Appl. No.: 09/546,347
Filed: Apr. 7, 2000

Related U.S. Application Data

(60) Provisional application No. 60/147,670, filed on Aug. 6, 1999.

(51) Int. Cl.
*G06Q 10/00* (2006.01)

(52) U.S. Cl. ........................................................ 705/28
(58) Field of Classification Search .................. None
See application file for complete search history.

(56) References Cited

U.S. PATENT DOCUMENTS

| 4,799,156 A | 1/1989 | Shavit et al. |
| 4,951,196 A | 8/1990 | Jackson |
| 5,361,199 A | 11/1994 | Shoquist et al. |
| 5,406,475 A | 4/1995 | Kouchi et al. |
| 5,446,880 A | 8/1995 | Balgeman et al. |
| 5,611,051 A | 3/1997 | Pirelli |
| 5,625,816 A | 4/1997 | Burdick et al. |
| 5,765,143 A | 6/1998 | Sheldon et al. |
| 5,799,157 A | 8/1998 | Escallon |
| 5,884,300 A | 3/1999 | Brockman |
| 5,913,210 A | 6/1999 | Call |
| 5,948,057 A | 9/1999 | Berger et al. |
| 5,950,173 A | 9/1999 | Perkowski |
| 5,953,707 A | 9/1999 | Huang et al. |

(Continued)

FOREIGN PATENT DOCUMENTS

| GB | 2336007 | 6/1999 |
| WO | WO 97/16797 | 5/1997 |
| WO | WO 98/49640 | 11/1998 |

OTHER PUBLICATIONS

Building the Data Warehouse, Second Edition, (W. H. Inmon), *Wiley Computer Publishing*, ISBN 0–471–14161–5, pp. v–x, 1–401 (pp. 407), Copyright 1996.

(Continued)

*Primary Examiner*—David O. Reip

(57) ABSTRACT

A method of monitoring supply chain activity throughout a plurality of supply chain sites includes extracting, at each supply chain site, supply-related data to be monitored. The data is maintained in plural formats at the supply chain sites, and translated the data to a common format. The extracted data is then uploaded to and collected, from each supply chain site, to a data collection center or site. Upon a user request, a portion of the collected data is formatted, at the data collection site, into one of a plurality of views, responsive to criteria selected by the user, for presentation to the user, the portion of formatted data being dependent on access rights granted to the user's supply chain site. Finally, the formatted data view is published to the user's supply chain site. The data collection center comprises a data collector in which the uploaded data is stored, and a publisher for publishing data from the data collector upon request. Each supply chain site has a data storage device for maintaining its own supply-chain data, a data transfer engine (DTE), for transferring the supply-chain data to the data collection center, input means for allowing a user to query the data collector, and a display for displaying data published by the publisher in response to a query. The inbound data received from the multiple supply chain sites is monitored at the data collection site. If a problem condition is detected, such as a forecasted or present shortage or surplus, an alert is asserted, for example, by highlighting an Alert indicator, such as an Alert tab, on a user screen. Upon selection of the highlighted Alert indicator by a user, details of the detected problem condition are displayed.

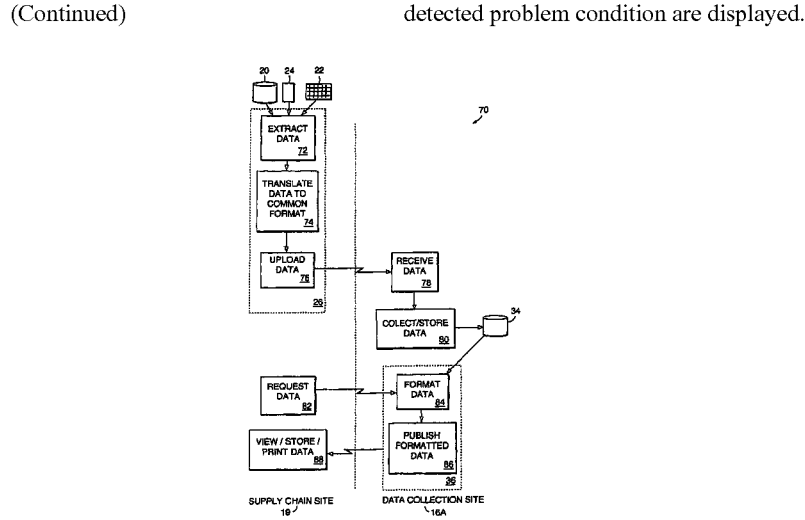

U.S. PATENT DOCUMENTS

| | | | |
|---|---|---|---|
| 5,966,707 | A | 10/1999 | Van Huben et al. |
| 5,974,395 | A | 10/1999 | Bellini et al. |
| 6,026,403 | A | 2/2000 | Siefert |
| 6,032,158 | A | 2/2000 | Mukhopadhyay et al. |
| 6,072,481 | A | 6/2000 | Matsushita et al. |
| 6,094,688 | A | 7/2000 | Mellen-Garnett et al. |
| 6,101,556 | A | 8/2000 | Piskiel et al. |
| 6,148,291 | A | 11/2000 | Radican |
| 6,157,915 | A | 12/2000 | Bhaskaran et al. |
| 6,163,602 | A | 12/2000 | Hammond et al. |
| 6,208,990 | B1 | 3/2001 | Suresh et al. |
| 6,222,533 | B1 | 4/2001 | Notani et al. |
| 6,249,786 | B1 | 6/2001 | Wadewitz |
| 6,266,805 | B1 | 7/2001 | Nwana et al. |
| 6,289,462 | B1 | 9/2001 | McNabb et al. |
| 6,324,522 | B2 | 11/2001 | Peterson |
| 6,327,594 | B1 | 12/2001 | Van Huben et al. |
| 6,341,271 | B1 | 1/2002 | Salvo et al. |
| 6,381,579 | B1 | 4/2002 | Gervais et al. |
| 6,401,131 | B1 | 6/2002 | Haverstock et al. |
| 6,462,644 | B1 | 10/2002 | Howell et al. |
| 6,517,587 | B2 | 2/2003 | Satyavolu et al. |
| 6,567,796 | B1 | 5/2003 | Yost et al. |
| 6,587,857 | B1 | 7/2003 | Carothers et al. |
| 6,622,056 | B1 | 9/2003 | Lindell |
| 6,651,062 | B2 | 11/2003 | Ghannam et al. |
| 6,738,975 | B1 | 5/2004 | Yee et al. |
| 6,873,997 | B1 | 3/2005 | Majjasie et al. |
| 6,934,687 | B1 | 8/2005 | Papierniak et al. |
| 6,947,903 | B1 | 9/2005 | Perry |
| 7,152,070 | B1 | 12/2006 | Musick et al. |

OTHER PUBLICATIONS

"IndX Software Corporation," *XHQ The Visual Enterprise*, pp. Siemens 000001–000229, undated.

Application Data Export User's Guide, Release 11, Part No. A58496–01, pp. 136, Copyright © Oracle Corporation 1998.

Oracle Alert® User's Guide, Release 11, Part No. A56103–01, pp. 187, 1997 (no month available).

Oracle® Applications Developer's Guide, Release 11, pp. 647, Apr. 1998.

Oracle® Payables User's Guide, Release 11, vol. 1, pp. 1,230, Mar. 1998.

Oracle® Receivables Tax Manual, Release 11, pp. 261, Mar. 1998.

Oracle® Receivables User's Guide, Release 11, vol. 1, pp. 1,430, Mar. 1998.

Oracle® Sales and Marketing Connected Client User's Guide, Release 11, pp. 329, Mar. 1998.

Oracle® Bills of Material User's Guide, Release 11, pp. 297, Mar. 1998.

Oracle® Cash Management User's Guide, Release 11, pp. 261, Mar. 1998.

Oracle® Supplier Scheduling User's Guide, Release 11, pp. 112, Mar. 1998.

Oracle® Sales Compensation User's Guide, Release 11, pp. 544, Mar. 1998.

Oracle® Capacity User's Guide, Release 11, pp. 142, Mar. 1998.

Oracle® Cost Management User's Guide, Release 11, pp. 426, Mar. 1998.

Oracle® Service User's Guide, Release 11, pp. 320, Mar. 1998.

Oracle® EDI Gateway User's Guide, Release 11, pp. 249, Mar. 1998.

Oracle® Engineering User's Guide, Release 11, pp. 135, Mar. 1998.

Oracle® Assets User's Guide, Release 11, pp. 585, Mar. 1998.

Oracle® Financials for Belgium User's Guide, Release 11, pp. 176, Mar. 1998.

Oracle® Financials for Brazil Implementation Manual, Release 11, pp. 304, Oct. 1998.

Oracle® Financials for Brazil User's Guide, Release 11, pp. 424, Mar. 1998.

Oracle® Financials Country–Specific Installation Supplement, Release 11, pp. 150, Mar. 1998.

Oracle® Financials for Denmark User's Guide, Release 11, pp. 40, Mar. 1998.

Oracle® Financials for European Region (EMEA) User's Guide, Release 11, pp. 128, Mar. 1998.

Oracle® Financials for Finland User's Guide, Release 11, pp. 78, Mar. 1998.

Oracle® Financials for France User's Guide, Release 11, pp. 50, Mar. 1998.

Oracle® Financials for Germany User's Guide, Release 11, pp. 138, Mar. 1998.

Oracle® Financials for Hungary User's Guide, Release 11, pp. 72, Mar. 1998.

Oracle® Financials for Israel User's Guide, Release 11, pp. 34, Mar. 1998.

Oracle® Financials for Italy User's Guide, Release 11, pp. 152, Mar. 1998.

Oracle® Financials for Japan User's Guide, Release 11, pp. 110, Mar. 1998.

Oracle® Financials for Korea User's Guide, Release 11, pp. 160, Release 11, Mar. 1998.

Oracle® Financials for the Netherlands User's Guide, Release 11, pp. 58, Mar. 1998.

Oracle® Financials for Norway User's Guide, Release 11, pp. 58, Mar. 1998.

Oracle® Financials Open Interfaces Manual, Release 11, pp. 95, Mar. 1998.

Oracle® Financials for Poland User's Guide, Release 11, pp. 52, Mar. 1998.

Oracle® Financials for Portugal User's Guide, Release 11, pp. 108, Mar. 1998.

Oracle® Financials for Singapore User's Guide, Release 11, pp. 48, Mar. 1998.

Oracle® Financials for Spain User's Guide, Release 11, pp. 146, Mar. 1998.

Oracle® Financials for Sweden User's Guide, Release 11, pp. 40, Mar. 1998.

Oracle® Financials for Switzerland User's Guide, Release 11, pp. 72, Mar. 1998.

Oracle® Financials for Taiwan User's Guide, Release 11, pp. 64, Mar. 1998.

Oracle® Financials for Thailand User's Guide, Release 11, pp. 78, Mar. 1998.

Oracle® Financials for Turkey User's Guide, Release 11, pp. 38, Mar. 1998.

Oracle® Financials for Italy Documentation Update, Release 11, pp. 16, Sep. 1998.

Oracle® Financials for Japan Documentation Update, Release 11.0.1, pp. 34, Aug. 1998.

Oracle® Applications Flexfields Guide, Release 11, pp. 395, Mar. 1998.

Oracle® Applications User's, Systems Administrator's, and Flexfields Documentation Updates, Release 11.0.1, pp. 53, Jun. 1998.

Oracle® Financials for the Netherlands Documentation Update, Release 11, pp. 26, Aug. 1998.

Oracle® Financials for Norway Documentation Update, Release 11, pp. 12, Sep. 1998.

Oracle® Financials for Portugal Documentation Update, Release 11.0.1, pp. 54, Oct. 1998.

Oracle® Financials for Spain Documentation Update, Release 11.0.1, pp. 72, Sep. 1998.

Oracle® Financials for Turkey, Documentation update, Release 11, pp. 12, Aug. 1998.

Oracle® Applications Global Accounting Engine™ User's Guide, Release 11, pp. 154, Mar. 1998.

Oracle® Applications Global Accounting Engine Documentation Update, Release 11.0.1, pp. 20, Jun. 1998.

Oracle® Process Manufacturing, AccountingSetup, Release 11.0, pp., Part No. A69858–01, pp. 58, Copyright © 1999, Oracle Corporation.

Oracle® Process Manufacturing, Cost Management, Release 11.0, Part No. A69857–01, pp. 182, Copyright © 1999, Oracle Corporation.

Oracle® Process Manufacturing, Capacity Planning, Release 11.0, Part No. A69960–01, pp. 84, Copyright © 1999, Oracle Corporation.

Oracle® Process Manufacturing, Forecasting, Release 11.0, Part No. A69851–01, pp. 28, Copyright © 1999, Oracle Corporation.

Oracle® Process Manufacturing and Oracle® Financials, Integration, Release 11.0, Part No. A69854–01, pp. 182, Copyright © 1999, Oracle Corporation.

Oracle® Process Manufacturing, Formula Management, Release 11.0, Part No. A70045–01, pp. 124, Copyright © 1999, Oracle Corporation.

Oracle® Process Manufacturing, Capacity Planning with Rhythm Factory Planner, Release 11.0, Part No. A70047–01, pp. 126, Copyright © 1999, Oracle Corporation.

Oracle® Process Manufacturing, Inventory Management, Release 11.0, Part No. A69852–01, pp. 282, Copyright © 1999, Oracle Corporation.

Oracle® Process Manufacturing, EC Intrastat Reporting, Release 11.0, Part No. A699957–01, pp. 44, Copyright © 1999, Oracle Corporation.

Oracle® Process Manufacturing, Laboratoty Management, Release 11.0, Part No. A69849–01, pp. 86, Copyright © 1999, Oracle Corporation.

Oracle® Process Manufacturing, Manufacturing Accounting Controller, Release 11.0, Part No. A69856–01, pp. 122, Copyright © 1999, Oracle Corporation.

Oracle® Process Manufacturing, MPS/MRP, Release 11.0, Part No. A69936–01, pp. 178, Copyright © 1999, Oracle Corporation.

Oracle® Process Manufacturing, Process Operation Controls, Release 11.0, Part No. A69959–01, pp. 93, Copyright © 1999, Oracle Corporation.

Oracle® Process Manufacturing, Physical Inventory, Release 11.0, Part No. A69853–01, pp. 98, Copyright © 1999, Oracle Corporation.

Oracle® Process Manufacturing, Production Management, Release 11.0, Part No. A70046–01, pp. 170, Copyright © 1999, Oracle Corporation.

Oracle® Process Manufacturing, Purchase Management, Release 11.0, Part No. A69935–01, pp. 125, Copyright © 1999, Oracle Corporation.

Oracle® Process Manufacturing, Quality Management, Release 11.0, Part No. A69850–01, pp. 122, Copyright © 1999, Oracle Corporation.

Oracle® Process Manufacturing, Implementation Guide, Release 11.0, Part No. A69954–01, pp. 210, Copyright © 1999, Oracle Corporation.

Oracle® Process Manufacturing, Order Fulfillment, Release 11.0, Part No. A69961–01, pp. 278, Copyright © 1999, Oracle Corporation.

Integrating Oracle® Financial Analyzer Release 6.2 with Oracle General Ledger Release 11, Release 1.0, Part No. A63464–01, pp. 138, Copyright © 1998, Oracle Corporation.

Oracle® General Ledger User's Guide, Release 11, vol. 1, pp. 992, Mar. 1998.

Oracle® General Ledger Documentation, Release 11.0.2, pp. 8, Oct. 1998.

Oracle HRMS™ Implementation Guide, Release 11.0, Part No. A58331–01, pp. 362, Copyright © Oracle Corporation 1997.

What's New in Oracle HRMS™ Release 11.0.2, Release 11.0.2, pp. 144, Oct. 1998.

Oracle Human Resources™ UK User's Guide, Release 11.0, Part No. A58347–01, pp. 730, Copyright © Oracle Corporation 1995.

Oracle HRMS™ US Implementation Guide, Release 11.0, Part No. A58332–01, pp. 428, Copyright © Oracle Corporation 1997.

Oracle Human Resources North American User's Guide, Release 11, vol. 1, pp. 908, Mar. 1998.

Oracle Time Management™ Implementation Guide, Release 11, pp. 101, Copyright © Oracle Corporation 1998.

Oracle Time Management™ Application Reference Manual, Release 11, pp. 120, Copyright © Oracle Corporation 1998.

Oracle Time Management™ Application User's Guide, Release 11, A58824–01, pp. 136, Copyright © Oracle Corporation 1998.

Oracle® Applications Implementation Wizard User's Guide, Release 11, pp. 65, Jun. 1998.

Oracle® Inventory User's Guide, Release 11, pp. 776, Mar. 1998.

Oracle® Inventory Documentation Updates, Release 11.0.1, pp. 6, Jun. 1998.

Oracle® Applications Character Mode to GUI Menu Path Changes, Release 11, pp. 285, Mar. 1998.

Oracle Applications Messages Manual, pp. 952, (no date available).

Oracle® Manufacturing, Distribution, Sales and Services, Open Interfaces Manual, Release 11, pp. 585, Mar. 1998.

Multiple Reporting Currencies in Oracle® Applications, Release 11, pp. 145, Mar. 1998.

Multiple Reporting Currencies, Documentation Update, Release 11.0.1, pp. 6, Mar. 1998.

Oracle® Master Scheduling/MRP and Oracle Supply Chain Planning User's Guide, Release 11, pp. 691, Mar. 1998.

Oracle® Master Scheduling/MRP and Oracle Supply Chain Planning Documentation Updates, Release 11.0.1, pp. 5, Jun. 1998.

Multiple Organizations in Oracle® Applications, Release 11, pp. 95, Mar. 1998.

Oracle® Applications User's Guide, Release 11, pp. 234, Mar. 1998.
Oracle® Order Entry/Shipping User's Guide, Release 11, vol. 1, pp. 876, Mar. 1998.
Oracle® Order Entry/Shipping Documentation Updates, Release 11.0.1, pp. 8, Jun. 1998.
Oracle Training Administration™ User's Guide, Release 11.0, Part No. A58282–01, pp. 326, Copyright © Oracle Corporation 1997.
Oracle Applications™ Product Update Notes, Release 10 SmartClient™ Production 16.1, Part No. A52639–02, pp. 263, Copyright © 1997 Oracle Corporation.
Oracle® Project Analysis Collection Pack Implementation Guide, Release 11, pp. 91, Mar. 1998.
Oracle® Project Time and Expense User's Guide, Release 11, pp. 52, Oct. 1998.
Oracle® Projects User's Guide, Release 11, vol. 1, pp. 1,471, Mar. 1998.
Oracle® Projects Documentation Update, Release 11.0.2, pp. 208, Oct. 1998.
Oracle Payroll™ UK User's Guide, Release 11.0, Part No. A58383–01, pp. 712, Copyright © Oracle Corporation 1996.
Oracle Payroll US User's Guide, Release 11, vol. 1, pp. 936, Mar. 1998.
Oracle® Project Manufacturing Implementation Manual, Release 11, pp. 169, Mar. 1998.
Oracle® Project Manufacturing User's Guide, Release 11, pp. 65, Mar. 1998.
Oracle® Purchasing User's Guide, Release 11, vol. 1, pp. 912, Mar. 1998.
Oracle® Purchasing Documenation Updates, Release 11.0.1, pp. 16, Jun. 1998.
Oracle® Public Sector Payables User's Guide, Release 11, vol. 1, pp. 1,232, Mar. 1998.
Oracle® Payables Documenation Update, Release 11.0.2, pp. 29, Oct. 1998.
Oracle® Public Sector Receivalbles User's Guide, Release 11, vol. 1, pp. 1,673, Jan. 1998.
Oracle® Receivables Documenation Update, Release 11.0.2, pp. 19, Oct. 1998.
Oracle® Public Sector General Ledger User's Guide, Release 11, vol. 1, pp. 1,030, Mar. 1998.
Oracle® General Ledger Documenation Update, Release 11.0.2, pp. 8, Oct. 1998.
Oracle® Public Sector Purchasing User's Guide, Release 1, vol. 1, pp. 892, Mar. 1998.
Oracle® Purchasing Documenation Updates, Release 11.0.1, pp. 22, Jun. 1998.
Oracle® Quality User's Guide, Release 11, pp. 349, Mar. 1998.
Oracle® Quality Documenation Updates, Release 11.0.1, pp. 5, Jun. 1998.
Oracle® Applications, Architecture, Release 11 for Windows NT, Part No. A63472–01, pp. 106, Oct. 1998.
Oracle® Applications, Oracle Applications Installation, Release 11 for Windows NT, Part No. A57978–01, pp. 304, Oct. 1998.
Oracle® Applications, Upgrade Manual, Release 11 for Windows NP, Part No. A57979–01, pp. 392, Oct. 1998.
Oracle® Applications Product Update Notes, Release 11, Part No. A57984–01, pp. 728, Copyright © 1998, Oracle Corporation.
Oracle® Applications, Concepts, Release 11 for UNIX, Part No. A63418–01, pp. 90, Apr. 1998.
Oracle® Applications, Oracle Applications Installation, Release 11 for UNIX, Part No. A57983–02, pp. 302, Jul. 1998.
Oracle® Applications NLS, Installation Guide, Release 11 for UNIX, Part No. A65054–03, pp. 50, Sep. 1998.
Oracle® Applications, Oracle Applications Upgrade Manual, Release 11, UNIX Edition, Part No. A57982–01, pp. 392, Apr. 1998.
Oracle® Applications System Administrator's Guide, Release 11, pp. 472, Mar. 1998.
Oracle SSP/SMP™ User's Guide, Release 11.0, Part No. A58285–01, pp. 156, Copyright © Oracle Corporation 1997.
Oracle® Applications User Interface Standards, Release 11, pp. 214, Mar. 1998.
Oracle® Automotive Implementation Manual, Release 11, pp. 277, Mar. 1998.
Oracle® Automotive User's Guide, Release 11, pp. 127, Mar. 1998.
Oracle® Self–Service Web Applications Implementation Manual, Release 11, pp. 159, Mar. 1998.
Oracle Workflow™ Guide, Release 2.0.3, Part No. A56104–01, pp. 375, Copyright © 1997 Oracle Corporation.
Oracle® Workflow Documentation Updates, Release 11.0.1, pp. 22, Jun. 1998.
Oracle® Work User's Guide, Release 11, pp. 610, Mar. 1998.
Oracle® Work in Process Documentation Updates, Release 11.0.1, pp. 4, Jun. 1998.
Oracle Applications, Overview of Alerts, pp. 59, <http://download.oracle.com/docs/cd/A60725_05/html/comnls/us/alr/overview.htm>, retrieved from the Internet on Jul. 30, 2009.
Complaint, *Elcommerce.com Inc.* v. *SAP AG et al.,* Civil No. 07–383 (E.D. TX Aug. 31, 2007).
Answer, *Elcommerce.com Inc.* v. *SAP AG et al.,* Civil No. 07–383 (E.D. TX Dec. 14, 2007).
"Oracle Sales and Marketing Connected Client User's Guide Release 11" Mar. 1998.
"Oracle Supplier Scheduling User's Guide Release 11" Mar. 1998.
"Oracle Cost Management User's Guide Release 11" Mar. 1998.
"Oracle Product Configurator User's Guide Release 11" Mar. 1998.
"Oracle Inventory User's Guide Release 11" Mar. 1998.
"Oracle Manufacturing, Distribution, Sales and Service Open Interfaces Manual Release 11" Mar. 1998.
"Oracle Manufacturing Implementation Manual Release 11" Mar. 1998.
"Oracle Quality User's Guide Release 11" Mar. 1998.
"Oracle Applications Upgrade Manual Release 11 for Windows NT" Oct. 1998.
"Oracle Applications Product Update Notes Release 11" 1998.
"Advanced Planner and Optimizer Workshop," *SAP AG,* WB600, pp. 1–1–5–99, 1–24, and 2 (Oct. 22, 1998).
"ALE Processing,"*SAP AG—ALE Empowering Workshop,* pp. 1–1–1–67 (Jun. 1998).
"CA910 Application Link Enabling," *SAP AG,* Rel.3.0f Preface, pp. 0–1–12–2 (Aug. 20, 1997).
"Customizing Change Management & Transporting," *SAP AG,* R/3 System, Release 3.1H, pp. 1–125 (Dec. 1997).

"IRT120 R/3 Retail: Merchandis Procurement and Distribution," *SAP AG*, pp. 0–1–6–5 and Appendix 1–26 (1997) (No month available).

"LO555, Special Features of LIS in Materials Management (NA)," *SAP AG*, pp. 0–1–6–8, Appendix A, Handout—1–8, and H1–1–H6–4 (Sep. 1997).

"LO630 Technical Aspects in LIS with Special Focus on SIS," Rel. 4.0B, *SAP AG*, pp. 0–1–9–9, exercise—1–57, solution 1–61, SAPi2A–00129624 (Aug. 26, 1998).

"SAP R/3 Customer Order Management Course, LO150, "Participation Handbook, R/3 System Releae 3.0F InfoDB Version, *SAP AG*, pp. 1–1–9–18, SAPi2A–00039729 (Oct. 1998).

"TABW10, SAP Business Information Warehouse I," System R/3 Release 4.5, Material No. 50029430, *SAP AG* SAPi2A–00147523 (Jun. 1999).

"WB100, R/3 Business Process Overview Workshop," Participant Guide, Rel. 3 .0f, *SAP AG*, pp. 0–1–7–2, SAPi2A–00059396 (Mar 1998).

"Handling High Data Volume in CO–PA," WB410A (Dirk Henrich), *SAP AG*, pp. 1–174, SAPi2A–00060842 (Jan. 4, 1999).

"Automotive Supplier Industry Solution Workshop," Participant Guide, W1210, Rel. 3.1H, *SAP AG*, pp. 0–1–10–10, A1–A3, SAPi2A–00062815 (Jun. 8, 1998).

SAP AG and SAP America, Inc.'s P.R. 3–3 Invalidity Contentions for U.S. Patent No. 6,947,903, 4,974 pp., Feb. 6, 2009.

SAP AG and SAP America, Inc.'s Patent Rule 3–3 Supplemental Invalidity Contentions for U.S. Patent No. 6,947,903, *Elcommerce.com.inc., v. SAP AG, and SAP America, Inc.,* Civil No. 07–383 (E.D. TX May 22, 2009).

SAP AG and SAP America, Inc.'s Patent Rule 3–3 Second Supplemental Invalidity Contentions for U.S. Patent No. 6,947,903, *Elcommerce.com.inc., v. SAP AG, and SAP America, Inc.,* Civil No. 07–383 (E.D. TX Jun. 2009).

Supplemental Exhibit C, Grounds of Invalidity Based on Indefiniteness under 35 U.S.C. § 112, ¶ 2, and Enablement/ Written Description under 35 U.S.C. § 112, ¶ 1, *Elcommerce.com.inc., v. SAP AG, and SAP America, Inc.,* Civil No. 07–383 (E.D. TX, undated).

Second Supplemental Exhibit C, Grounds of Invalidity Based on Indefiniteness under 35 U.S.C. § 112, ¶ 2, and Enablement/Written Description under 35 U.S.C. § 112, ¶ 1, *Elcommerce.com.inc., v. SAP AG, and SAP America, Inc.,* Civil No. 07–383 (E.D. TX, undated).

Exhibit D, SAP's Second Supplemental Invalidity Contentions Regarding U.S. Patent No. 6,947,903, *Elcommerce.com.inc., v. SAP AG, and SAP America, Inc.,* Civil No. 07–383 (E.D. TX, undated).

Oracle® Applications, One–Hour Install Guide, Release 11 for UNIX, Part No. A68025–01, pp. 56, Jan. 1999.

Oracle® Applications, One–Hour Install guide, Release 11 for Windows NT, Part No. A69043–01, pp. 50, Mar. 1999.

Oracle Alert® Documentation Updates, Release 11.0.1, pp. 6, Jun. 1998.

Oracle® Payable Documentation Update, Release 11.0.2, pp. 29, Oct. 1998.

Integrating Oracle® Receivables with Taxware® Sales/Use Tax System, Release 11, pp. 79, Oct. 1998.

Oracle® Receivables Documentation Update, Release 11.0.2, pp. 19, Oct. 1998.

Integrating Oracle® Receivables with Vertex® Quantum, Release 11, pp. 80, Oct. 1998.

Oracle® Bills of Material Documentation Updates, Release 11.0.1, pp. 9, Jun. 1998.

Oracle® Cash Management Documentation Update, Release 11.0.1, pp. 5, Jun. 1998.

Oracle® Supplier Scheduling Documentation Updates, Release 11.0.1, pp. 3, Jun. 1998.

Oracle® Cost Management Documentation Updates, Release 11.0.1, pp. 22, Jun. 1998.

Oracle® Service Documentation Updates, Release 11.0.1, pp. 4, Jun. 1998.

Oracle® Product Configurator User's Guide, Release 11, pp. 95, Mar. 1998.

Oracle® Product Configurator Documentation Updates, Release 11.0.1, pp. 4, Jun. 1998.

Oracle® EDI Gateway Documentation Updates, Release 11.0.1, pp. 15, Jun. 1998.

Oracle® Financials for Australia Documentation Update, Release 11.0.1, pp. 32, Jun. 1998.

Oracle® Assets Documentation Update, Release 11.0.1, pp. 4, Jun. 1998.

Oracle® Financials for Austria Documentation Update, Release 11.0.1, pp. 10, Jun. 1998.

Oracle® Financials for Belgium Documentation Update, Release 11, pp. 10, Aug. 1998.

Oracle® Financials for Brazil Documentation Update, Release 11.0.1, pp. 100, Jul. 1998.

Oracle® Financials for Brazil Implementation Manual Documentation Update, Release 11, pp. 82, Jul. 1998.

Oracle® Financials for Canada Documentation Update, Release 11.0.1, pp. 50, Jul. 1998.

Oracle® Financials for European Region (EMEA) Documentation Update, Release 11.0.1, pp. 54, Aug. 1998.

Oracle® Financials for Finland Documentation Update, Release 11.0.1, pp. 24, Aug. 1998.

Oracle® Financials for France Documentation Update, Release 11, pp. 10, Aug. 1998.

Oracle FastFormula™ User's Guide, Release 11.0, Part No. A58346–01, pp. 105, Copyright © Oracle Corporation 1995.

Oracle® Financials for Germany Documentation Update, Release 11.0.1, pp. 50, Oct. 1998.

Oracle® Financials for Argentina Implementation Manual, Release 11, pp. 48, May 1998.

Oracle® Financials for Argentina User's Guide, Release 11, pp. 46, Mar. 1998.

Oracle® Financials for Australia User's Guide, Release 11, pp. 74, Mar. 1998.

Oracle® Financials for Austria User's Guide, Release 11, pp. 42, Mar. 1998.

Oracle® Financials for Canada User's Guide, Release 11, pp. 92, Mar. 1998.

Oracle® Financials for Canada Upgrade Manual, Release 11, pp. 40, Mar. 1998.

Oracle® Financials for China User's Guide, Release 11, pp. 66, Mar. 1998.

Oracle® Financials for the Czech Republic User's Guide, Release 11, pp. 48, Mar. 1998.

Bontempo et al., *The IBM Data Warehouse Architecture,* Communications of the ACM, vol. 41, No. 9, pp. 38–48, published Sep. 1998.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–55 is confirmed.

* * * * *

(12) INTER PARTES REEXAMINATION CERTIFICATE (923rd)
United States Patent
Perry

(10) Number: US 6,947,903 C2
(45) Certificate Issued: Aug. 1, 2014

(54) METHOD AND SYSTEM FOR MONITORING A SUPPLY-CHAIN

(75) Inventor: Brian M. Perry, Upton, MA (US)

(73) Assignee: Elcommerce.com Incorporated, Franklin, MA (US)

Reexamination Request:
No. 95/000,557, Jul. 16, 2010

Reexamination Certificate for:
Patent No.: 6,947,903
Issued: Sep. 20, 2005
Appl. No.: 09/546,347
Filed: Apr. 7, 2000

Reexamination Certificate C1 6,947,903 issued Apr. 6, 2010

Related U.S. Application Data

(60) Provisional application No. 60/147,670, filed on Aug. 6, 1999.

(51) Int. Cl.
*G06Q 10/00* (2012.01)

(52) U.S. Cl.
USPC .......................................................... 705/28

(58) Field of Classification Search
None
See application file for complete search history.

(56) References Cited

To view the complete listing of prior art documents cited during the proceeding for Reexamination Control Number 95/000,557, please refer to the USPTO's public Patent Application Information Retrieval (PAIR) system under the Display References tab.

*Primary Examiner* — William Doerrler

(57) ABSTRACT

A method of monitoring supply chain activity throughout a plurality of supply chain sites includes extracting, at each supply chain site, supply-related data to be monitored. The data is maintained in plural formats at the supply chain sites, and translated the data to a common format. The extracted data is then uploaded to and collected, from each supply chain site, to a data collection center or site. Upon a user request, a portion of the collected data is formatted, at the data collection site, into one of a plurality of views, responsive to criteria selected by the user, for presentation to the user, the portion of formatted data being dependent on access rights granted to the user's supply chain site. Finally, the formatted data view is published to the user's supply chain site. The data collection center comprises a data collector in which the uploaded data is stored, and a publisher for publishing data from the data collector upon request. Each supply chain site has a data storage device for maintaining its own supply-chain data, a data transfer engine (DTE), for transferring the supply-chain data to the data collection center, input means for allowing a user to query the data collector, and a display for displaying data published by the publisher in response to a query. The inbound data received from the multiple supply chain sites is monitored at the data collection site. If a problem condition is detected, such as a forecasted or present shortage or surplus, an alert is asserted, for example, by highlighting an Alert indicator, such as an Alert tab, on a user screen. Upon selection of the highlighted Alert indicator by a user, details of the detected problem condition are displayed.

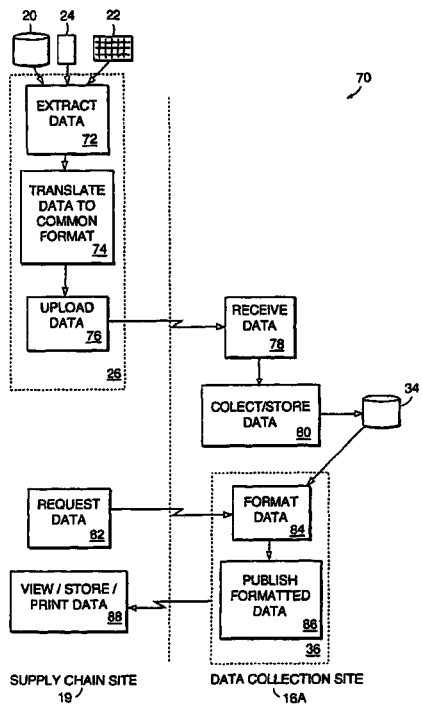

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-55 are cancelled.

* * * * *